(12) United States Patent
Salvino et al.

(10) Patent No.: US 12,404,769 B1
(45) Date of Patent: Sep. 2, 2025

(54) HEAT RECOVERY ARRANGEMENT

(71) Applicant: LUNAR HELIUM-3 MINING, LLC, Scottsdale, AZ (US)

(72) Inventors: Chris Salvino, Scottsdale, AZ (US); Drew DeJarnette, San Diego, CA (US); Paul A Beatty, Fort Collins, CO (US)

(73) Assignee: LUNAR HELIUM-3 MINING, LLC, Scottsdale, AZ (US)

( * ) Notice: Subject to any disclaimer, the term of this patent is extended or adjusted under 35 U.S.C. 154(b) by 0 days.

(21) Appl. No.: 19/079,201

(22) Filed: Mar. 13, 2025

Related U.S. Application Data

(63) Continuation-in-part of application No. 18/798,615, filed on Aug. 8, 2024.

(51) Int. Cl.
| | |
|---|---|
| *E21C 51/00* | (2006.01) |
| *B64G 1/16* | (2006.01) |
| *F24S 20/00* | (2018.01) |
| *F24S 23/70* | (2018.01) |
| *F24S 23/71* | (2018.01) |
| *F24S 80/20* | (2018.01) |

(52) U.S. Cl.
CPC .............. *E21C 51/00* (2013.01); *B64G 1/16* (2013.01); *F24S 20/00* (2018.05); *F24S 23/71* (2018.05); *F24S 2023/878* (2018.05); *F24S 80/20* (2018.05)

(58) Field of Classification Search
CPC .. B10D 7/02; E21C 51/00; F24S 23/71; F24S 23/12; F24S 40/55; B64G 1/16

USPC ................ 126/684–685, 688–690, 568–713; 405/128.55, 128.6; 96/4
See application file for complete search history.

(56) References Cited

U.S. PATENT DOCUMENTS

| | | | | |
|---|---|---|---|---|
| 3,536,908 A | * | 10/1970 | Oster ................... | F21S 10/005 362/559 |
| 3,638,312 A | * | 2/1972 | Szwarc ................ | G02B 6/4298 433/25 |
| 3,985,116 A | * | 10/1976 | Kapany .................. | F24S 80/50 428/179 |
| 4,026,267 A | * | 5/1977 | Coleman ................ | F24S 23/30 136/246 |
| 4,201,197 A | * | 5/1980 | Dismer .................. | F24S 23/71 126/685 |

(Continued)

OTHER PUBLICATIONS

Rice, Development of Lunar Ice/Hydrogen Recovery System Architecture, Jan. 1, 2000, p. 36, NIAC, Madison, WI.

*Primary Examiner* — Vivek K Shirsat
(74) *Attorney, Agent, or Firm* — Kenneth Altshuler

(57) ABSTRACT

Described herein are embodiments directed to a heat recovery arrangement for collecting vaporized gas trapped in regolith. The heat recovery arrangement generally comprising a rover that carries heat recovery elements that cooperate with a primary heat source. The heat recovery elements include a preheat contact element that preheats a region of regolith before the region is brought to high heat by the primary heat source. As the rover moves forward, the preheat contact element receives heat collected from the high heat region via a heat recovery sled that moves in contact with the high heat region. Heat is transferred between the heat recovery sled and the preheat contact element via a heat transfer medium that circulates through the heat recovery sled and preheat contact element.

20 Claims, 20 Drawing Sheets

(56) References Cited

U.S. PATENT DOCUMENTS

| | | | | |
|---|---|---|---|---|
| 4,240,692 A | * | 12/1980 | Winston | G02B 6/262 |
| | | | | 136/246 |
| 4,282,858 A | * | 8/1981 | Bowers, Jr. | F24S 50/20 |
| | | | | 126/685 |
| RE31,678 E | * | 9/1984 | Ochiai | F21S 11/00 |
| | | | | 385/115 |
| 4,511,755 A | * | 4/1985 | Mori | F21S 11/00 |
| | | | | 136/246 |
| 5,168,158 A | | 12/1992 | McComas et al. | |
| 7,514,694 B2 | | 4/2009 | Stephan et al. | |
| 7,919,758 B2 | | 4/2011 | Stephan et al. | |
| 7,973,235 B2 | * | 7/2011 | Muhs | F24S 23/79 |
| | | | | 136/246 |
| 8,063,300 B2 | * | 11/2011 | Horne | H10F 77/488 |
| | | | | 136/246 |
| 8,330,115 B2 | | 12/2012 | Frank | |
| 9,134,047 B2 | | 9/2015 | Black et al. | |
| 9,261,468 B2 | | 2/2016 | Bingham et al. | |
| 9,599,729 B2 | | 3/2017 | Roscoe et al. | |
| 10,222,121 B2 | | 3/2019 | Cullinane et al. | |
| 11,624,542 B2 | | 4/2023 | Sung | |
| 12,091,973 B1 | * | 9/2024 | Salvino | E21C 51/00 |
| 2012/0017888 A1 | * | 1/2012 | Garza | F24S 23/12 |
| | | | | 126/678 |
| 2013/0034198 A1 | | 2/2013 | Chandrasekharan et al. | |
| 2016/0102890 A1 | * | 4/2016 | Saucedo | F24S 23/79 |
| | | | | 126/690 |
| 2017/0146202 A1 | * | 5/2017 | Stone | F21K 9/61 |
| 2019/0200510 A1 | * | 7/2019 | Chrysanthakopoulos | |
| | | | | A01B 59/043 |
| 2019/0200519 A1 | * | 7/2019 | Chrysanthakopoulos | |
| | | | | B25J 9/1697 |
| 2020/0240267 A1 | * | 7/2020 | Sercel | B64G 99/00 |
| 2022/0090500 A1 | * | 3/2022 | Sercel | E21C 51/00 |
| 2023/0000003 A1 | * | 1/2023 | Chrysanthakopoulos | |
| | | | | A01M 21/046 |
| 2023/0304403 A1 | * | 9/2023 | Kuhns | B64G 1/16 |
| 2023/0411134 A1 | | 12/2023 | Ryan et al. | |
| 2024/0035379 A1 | | 2/2024 | Grillos | |

* cited by examiner

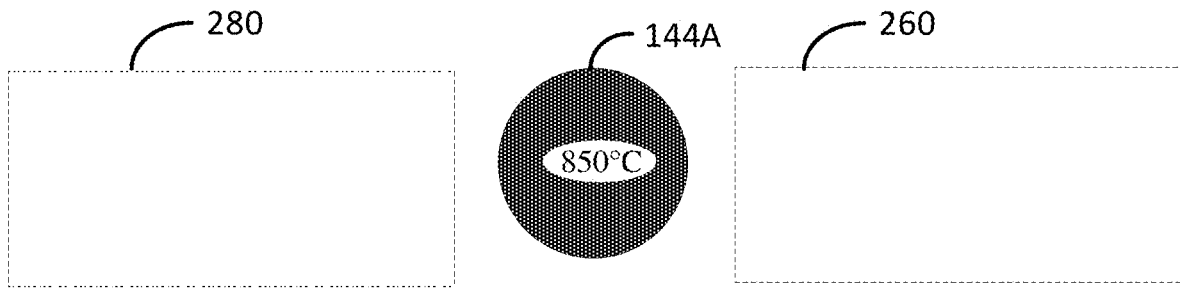
FIG. 6D1
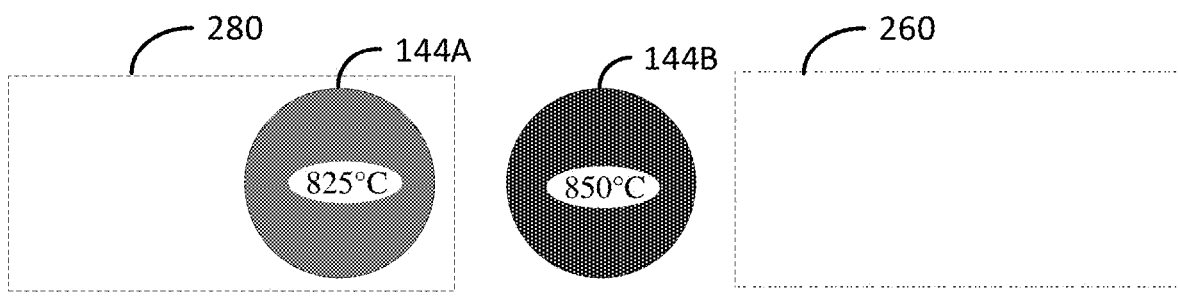
FIG. 6D2
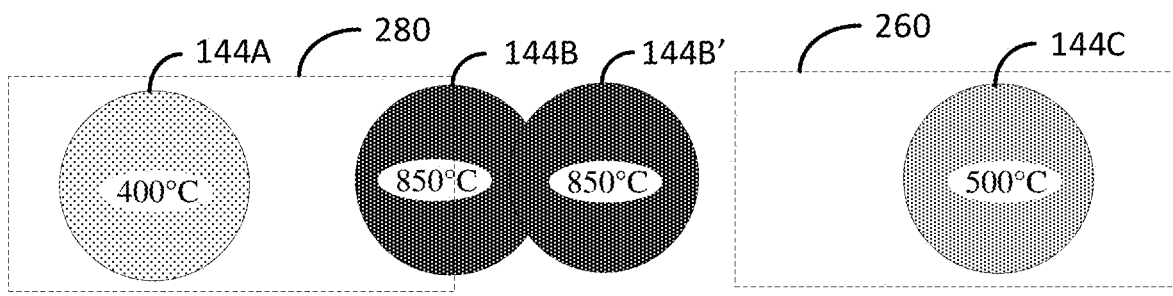
FIG. 6D3

HEAT RECOVERY ARRANGEMENT

CROSS-REFERENCE TO RELATED APPLICATIONS

This continuation-in-part application which claims priority to and the benefit of U.S. patent application Ser. No. 18/798,615 entitled: COMPOUND PARABOLIC CONCENTRATOR ARRANGEMENT, filed on Aug. 8, 2024, the entire disclosure of which is hereby incorporated by reference.

BACKGROUND OF THE INVENTION

1. Field of the Invention

The present invention relates generally to heat recovery for mining extraterrestrial sites for gas trapped in extraterrestrial soil.

2. Description of Related Art

Helium-3 (He-3) holds immense potential as a clean and efficient energy source, offering numerous benefits for various applications. It has been discovered that He-3 is a highly efficient fuel for nuclear fusion, which has the potential to provide a nearly limitless and environmentally friendly energy solution. When He-3 fuses with deuterium, it produces a helium atom, a proton, and a tremendous amount of energy. Unlike traditional nuclear fission, fusion reactions release energy without generating hazardous radioactive waste or greenhouse gas emissions. Harnessing He-3 for fusion could revolutionize the energy landscape, providing a stable and sustainable source of power for the future.

However, despite its remarkable benefits, mining He-3 on Earth faces significant limitations. For one thing, He-3 is incredibly scarce on our planet. It is primarily found in minute quantities in the top surfaces of lunar soil, known as regolith, and is sparsely present in the Barth's atmosphere. Consequently, the extraction of He-3, whether on Earth or the Moon, is challenging and expensive. Moreover, mining it on the Moon poses logistical difficulties requiring advanced technologies and significant investments. Even assuming mining on the Moon is successful, transporting the mined He-3 from the Moon to Earth presents significant technical challenges and high costs. These limitations highlight the need for further research and development to find more accessible and cost-effective sources of He-3 or to explore alternative fusion fuel options that do not rely solely on He-3.

The subject matter disclosed herein is generally directed to innovations related to collecting He-3 and other useable gaseous elements on extra-terrestrial bodies.

SUMMARY OF THE INVENTION

The present invention generally relates to heat recovery to be used to improve extraction efficiency for gases trapped in extraterrestrial soil.

Certain embodiments of the present invention envision a heat recovery arrangement generally comprising a rover carrying a primary heat source that cooperates with an arrangement of heat recovery elements. The rover can be defined has having wheels or tracks that move the rover over an extra-terrestrial surface. The rover can be defined between a rover front end and a rover rear end, wherein the rover is configured to travel in a direction leading with the rover front end. The heat recovery elements include a preheat contact element and a heat recovery sled, both of which are configured to rest atop granular soil. The heat recovery elements further include a gap that separates the preheat contact element from the heat recovery sled, wherein the preheat contact element is closer to the rover front end than the heat recovery sled. The heat recovery arrangement further includes a primary heat source (configured to heat the granular soil in the gap) and a gas collecting shield covering at least the gap. The heat recovery elements further include a heat exchange tube comprising a feed line, a return line, a heat collecting coil, and a heat emitting coil, wherein the feed line is configured to flow heated medium from a heat collecting coil to the to the heat emitting coil, the return line is configured to flow cooled medium from the heat emitting coil to the heat collecting coil. The heat recovery sled contains the heat collecting coil and the preheat contact element contains the heat emitting coil. The gas collecting shield, the preheat contact element and the heat recovery sled are located under the rover.

Still other embodiments envision a heat recovery system generally comprising a rover carrying a primary heat source that cooperates with an arrangement of heat recovery elements, the rover being configured to move in a forward direction. The heat recovery elements can include a preheat contact element that is configured to contact and preheat granular soil and a heating gap between the preheat contact element and a heat recovery sled. The heat recovery system further includes a primary heat source that is configured and arranged to heat a region of the preheated granular soil in the gap. The heat recovery sled is configured and arranged to collect at least a portion of the heat from the region when the rover moves the heat recovery sled in contact with the region. The heat recovery system further includes a gas collecting shield covering at least the gap, wherein the gas collecting shield is configured to contain gas liberated from the granular soil when the granular soil is heated by the primary heat source. The heat recovery elements further include a heat exchange tube comprising a feed line (that is configured to carry warmed medium from a heat collecting coil in the preheat contact element to a heat emitting coil in the heat recovery sled) and a return line (that is configured to carry cooled medium from the heat emitting coil to the to the heat collecting coil). The gas collecting shield, the preheat contact element and the heat recovery sled are located on an underside the rover.

While other embodiment of the present invention contemplates a method for using one or more rovers supporting a heat recovery system wherein the method generally comprises steps for heating granular soil, such as regolith, while moving the rover. More specifically, the method can include a heating step for heating a first region of granular soil in a gap between a preheat contact element and a heat recovery sled with a primary heat source. Moving the heat recovery sled in contact with the first region of granular soil. Warming a medium that is circulating through a heat collecting coil while the heat recovery sled is in contact with the first region of granular soil. The coil being embedded in or otherwise snaking through the heat recovery sled. The warming step is accomplished by collecting a portion of the heat from the heated granular soil. The method further includes preheating a second region of granular soil by circulating the warmed medium through a heat emitting coil embedded in the preheat contact element. Moving the gap over the preheated second region of granular soil and heating the preheated second region of granular soil via the primary heat source.

Yet other embodiments of the present invention contemplate a CPC heating arrangement that generally comprises a transporter that carries a plurality of CPCs that are equipped to heat granular soil to mine target gases trapped in the granular soil. More specifically, the transporter comprises a transporter body defining a top end and a bottom end, wherein the bottom end is configured to interface a surface of an extra-terrestrial body. The transporter is configured to be moved in different locations on the extra-terrestrial body, such as the moon. The CPC arrangement further comprises a cover having an internal cover volume, which is a volume within the cover defined from between a cover rim and an inside cover top of the cover. The internal cover volume defines a shielded environment when the cover rim rests atop granular soil. The shielded environment is the internal volume of the cover and is only in communication with an outside environment via the cover rim when the cover rim is not resting atop the granular soil. Resting atop means in contact with the granular soil wherein there are essentially no gaps between the granular soil surface and the cover rim. Resting can be wherein at least a portion of the weight of the cover is supported by the granular soil or if the cover is pressed into the granular soil via a motorized actuator connected to the transporter. The plurality of CPCs extends from the top end, such as an array on an armature or frame. Each CPC comprises a concave reflective bowl having a refractive index of at least 1.4. Each of the concave reflective bowls are defined between a bowl rim and a bowl apex, wherein the bowl rim is configured to confront the sun and the bowl apex is configured to receive sunlight from the concave reflective bowl. Each of the concave reflective bowls further comprises a fiberoptic cable extending from a fiberoptic inlet end connected to the bowl apex to a fiberoptic outlet end located in the internal volume. The fiberoptic outlet end is configured to reside within 6 inches from the granular soil. The sunlight is configured to be received at the fiberoptic inlet end and emitted at the fiberoptic outlet end.

Another embodiment of the present invention contemplates a CPC arrangement generally comprising a transporter, an internal cover volume and a cryogenically cooled surface. The transporter supports a plurality of CPCs each configured to receive sunlight. Each CPC comprises a concave reflective bowl defined between a bowl rim and a bowl apex comprising a bowl aperture and a fiberoptic cable extending from a fiberoptic inlet end at the apex to a fiberoptic outlet end. The fiberoptic outlet end is configured to emit the sunlight received at the fiberoptic inlet end from the bowl aperture on a granular surface. The CPC arrangement further comprises an internal cover volume defined within a cover that extends from an internal cover top to a cover rim. There is a cryogenically cooled surface within the internal cover volume, wherein the cryogenically cooled surface is configured to be cooled by cryogenic liquid. The fiberoptic outlet end extends into the internal cover volume.

Still another embodiment of the present invention contemplates a CPC system that generally comprises a transporter that carries a plurality of CPCs that are equipped to heat regolith to mine target gases trapped in the regolith. More specifically, the transporter defines a top end and a bottom end with the bottom end being configured to interface regolith. The transporter configured to be moved in different locations on the moon. The CPC system further comprises a cover that defines a shielded environment when a cover rim of the cover rests atop the regolith. The shielded environment (or the internal cover volume when not in contact with the regolith) is only in communication with an outside environment via the cover rim when the cover does not rest atop the regolith. The plurality of CPCs extends from the top end, wherein each CPC comprises a concave parabolic reflective bowl. Each of the concave reflective bowls is defined between a bowl rim and a bowl apex, wherein the bowl rim is configured to receive sunlight. An aperture in the bowl apex is configured to receive the sunlight from the concave reflective bowl. A fiberoptic cable extends from a fiberoptic inlet end to a fiberoptic outlet end and connects to the bowl apex at the fiberoptic inlet end. The fiberoptic cable is in light communication with the aperture, meaning light moves through the aperture and into the fiberoptic cable. The fiberoptic outlet end is in the shielded environment and is configured to interface the regolith. The fiberoptic cable is configured to transmit the sunlight from the fiberoptic inlet end through the fiberoptic outlet end.

Certain other embodiments of the present invention envision a CPC and gas collection arrangement that generally comprises a transporter that carries a plurality of CPCs that are equipped to heat granular soil to mine target gases trapped in the granular soil. More specifically, the transporter is configured to be moved in different locations on the moon. The arrangement further comprises a cover that defines a shielded environment when a cover rim of the cover rests atop the regolith. The shielded environment is not in communication with an outside environment. Each of the plurality of CPCs comprises a concave parabolic reflective bowl defined between a bowl rim and a bowl apex. The bowl rim is configured to receive sunlight and direct the sunlight to the aperture at the bowl apex.

BRIEF DESCRIPTION OF THE DRAWINGS

FIGS. 6A-6G are line drawings illustratively depicting a heat recovery arrangement that can be used in conjunction with the CPC and gas collection arrangement consistent with embodiments of the present invention.

DETAILED DESCRIPTION

Figure 1A:
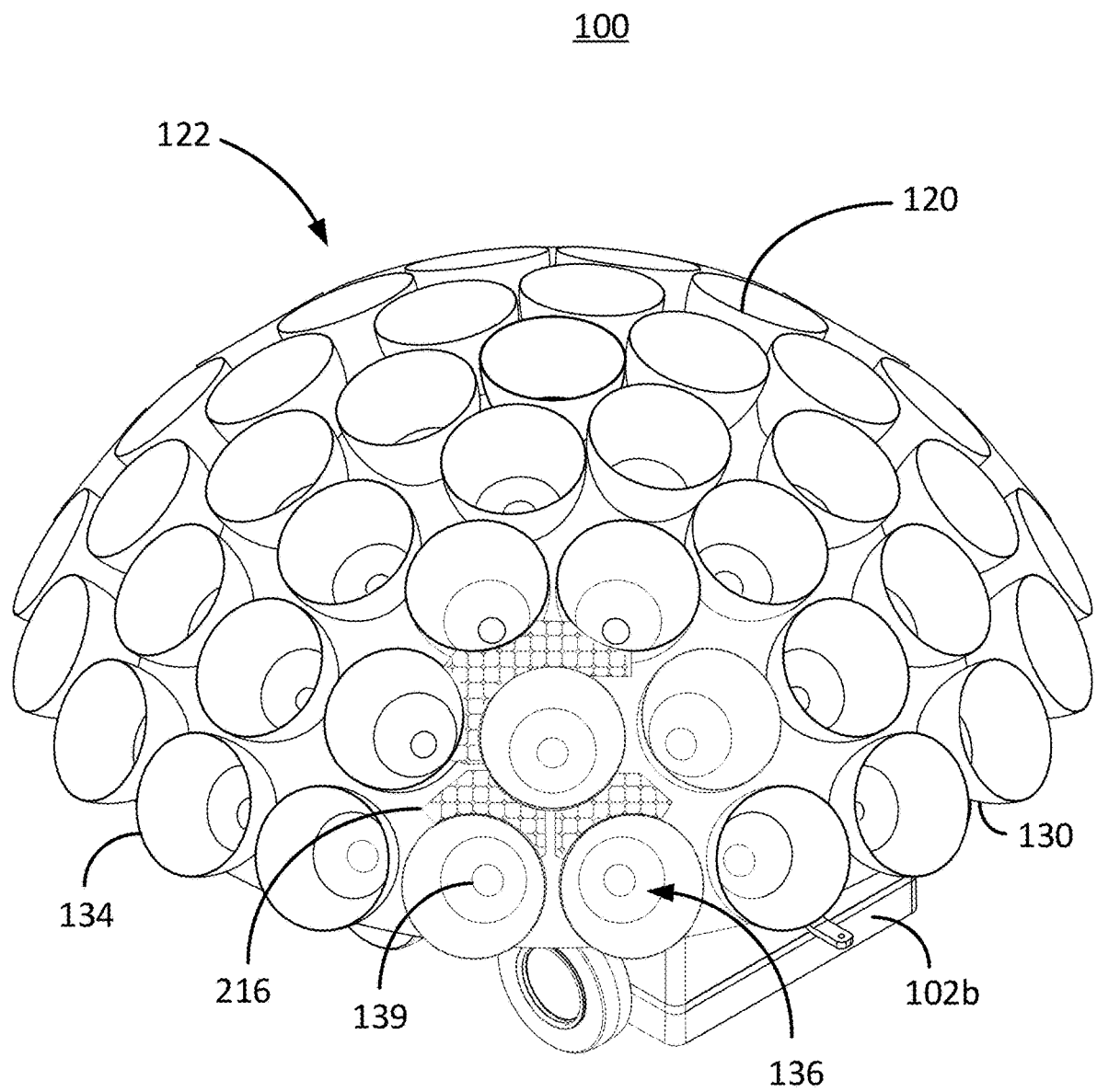
FIGS. 1A-1D are line drawings of a compound parabolic concentrator and gas collection arrangement constructed in accordance with embodiments of the present invention.

Initially, this disclosure is by way of example only, not by limitation. Thus, although the instrumentalities described herein are for the convenience of explanation, shown and described with respect to exemplary embodiments, it will be appreciated that the principles herein may be applied equally in other similar configurations involving the subject matter directed to the field of the invention. The phrases "in one embodiment", "according to one embodiment", and the like, generally mean the particular feature, structure, or characteristic following the phrase, is included in at least one embodiment of the present invention and may be included in more than one embodiment of the present invention. Importantly, such phases do not necessarily refer to the same embodiment. If the specification states a component or feature "may", "can", "could", or "might" be included or have a characteristic, that particular component or feature is not required to be included or have the characteristic. As used herein, the terms "having", "have", "including" and "include" are considered open language and are synonymous with the term "comprising". Furthermore, as used herein, the term "essentially" is meant to stress that a characteristic of something is to be interpreted within acceptable tolerance margins known to those skilled in the art in keeping with typical normal world tolerance, which is analogous with "more or less." For example, essentially flat, essentially straight, essentially on time, etc. all indicate that these characteristics are not capable of being perfect within the sense of their limits. Accordingly, if there is no specific+/−value assigned to "essentially", then assume essentially means to be within +/−2.5% of exact. The term "connected to" as used herein is to be interpreted as a first element physically linked or attached to a second element and not as a "means for attaching" as in a "means plus function". In fact, unless a term expressly uses "means for" followed by the gerund form of a verb, that term shall not be interpreted under 35 U.S.C. § 112 (f). In what follows, similar or identical structures may be identified using identical callouts.

With respect to the drawings, it is noted that the figures are not necessarily drawn to scale and are diagrammatic in nature to illustrate features of interest. Descriptive terminology such as, for example, upper/lower, top/bottom, horizontal/vertical, left/right and the like, may be adopted with respect to the various views or conventions provided in the figures as generally understood by an onlooker for purposes of enhancing the reader's understanding and is in no way intended to be limiting. All embodiments described herein are submitted to be operational irrespective of any overall physical orientation unless specifically described otherwise, such as elements that rely on gravity to operate, for example.

Described herein are embodiments directed to collecting gaseous atoms and molecules in an extremely low-pressure environment and collecting those gaseous atoms and molecules using cryogenically cooled surfaces, such as plates. Extremely low-pressure environment is defined herein as below $1\times10^{-5}$ bars, wherein pressure at sea-level on Earth is approximately 1 bar. Aspects of the present invention consider mining gaseous atoms and molecules on extraterrestrial bodies such as the Moon, asteroids, moons orbiting other planets, etc., for example. Many of these extraterrestrial bodies have little to no ambient pressure at or just beyond their surfaces and depending on the size of the extraterrestrial body have a significantly lower gravitational pull than that experienced on Earth.

Though embodiments of the present invention can be used in conjunction with many different extraterrestrial bodies, it is one object of the present invention to focus on mining gaseous atoms and molecules (materials) from the Moon. The Moon's atmosphere (the surface boundary exosphere) has a pressure of about $3\times10^{-15}$ bars and can range in temperature between 20° to 400° Kelvin. In the interest of continued exploration of the Moon as well as maintaining long-term residents on the Moon, extracting or otherwise mining important gaseous materials from the Moon, such as oxygen, nitrogen, hydrogen, and helium, for example, reduces the dependency of transporting such gaseous materials from the Earth. Moreover, helium-3 (He-3), a light stable isotope of helium having two protons and one neutron, which has promise as an important constituent in fusion reactions, is far more abundant on the Moon than the Earth. In some estimates, helium-3 is more than a thousand times more abundant on the Moon than compared to the Earth making the Moon a better target to obtain helium-3.

Certain embodiments of the present invention envision extracting target gaseous materials from the Moon by heating up moon regolith (lunar soil/minerals) to desorb valuable gas, such as He-3, that is bound to the regolith. A target gas is a specific gas that is desired to be obtained. Desorbing temperatures are defined as temperatures that are high enough to liberate/desorb (and possibly vaporize) these target gaseous materials from moon regolith, or simply "regolith". Desorbing temperatures may start around 600° C. The desorbed target gaseous materials such as He-3 are then collected as liquid from condensation surfaces that are at or below the condensation temperatures corresponding to each of the target gaseous materials. When condensed i.e., liquefied, the liquid or frozen, which improves the transportation of these target materials.

Presented below are embodiments directed to collecting gas via a CPC arrangement. The CPC arrangement generally comprises a transporter that carries around a cover with one or more cryogenically cooled condensation plates (or some other cryogenically cooled condensation surface) therein. A plurality of CPCs dispersed on the transporter each have a concave reflective bowl that captures and directs sunlight through a fiberoptic cable where the sunlight is focused on regolith in an internal environment defined within the cover when resting atop the regolith. The focused sunlight heats the regolith and liberates the gas from the regolith, which is trapped in the internal environment. The gas in the internal environment condenses on the cooled plates where it can be collected and processed.

Figure 1B:
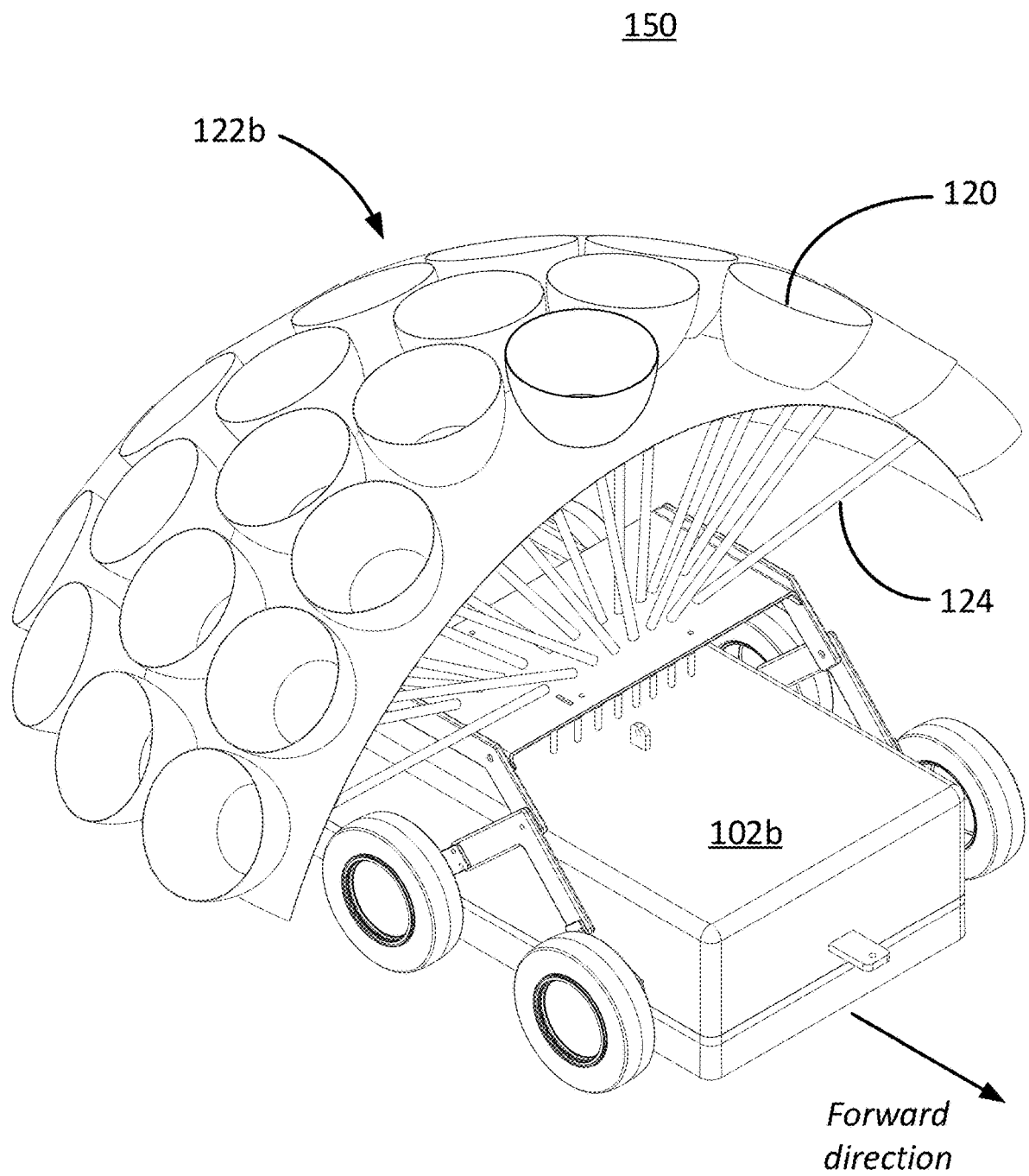
Figure 1C:
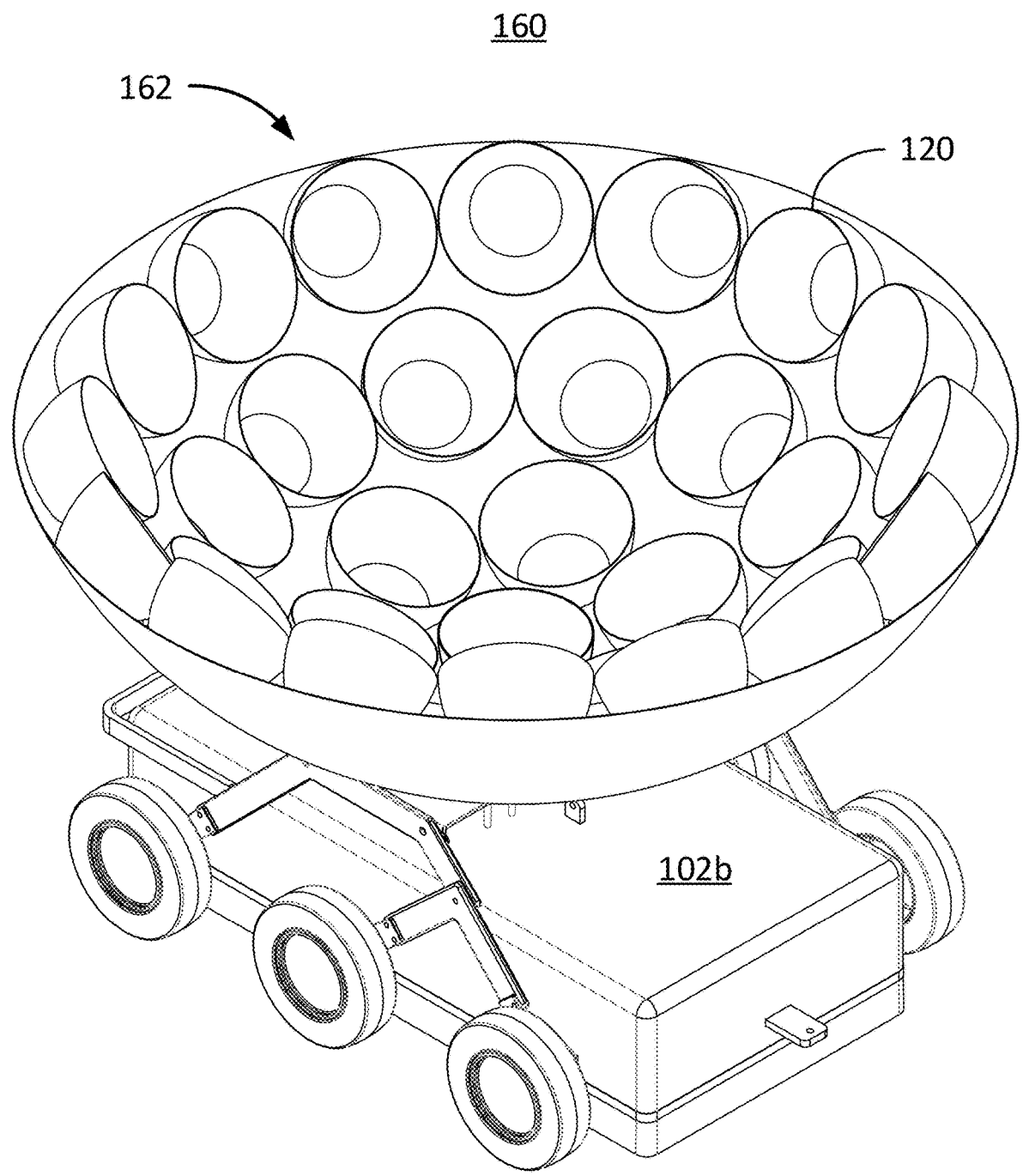
Figure 1D:
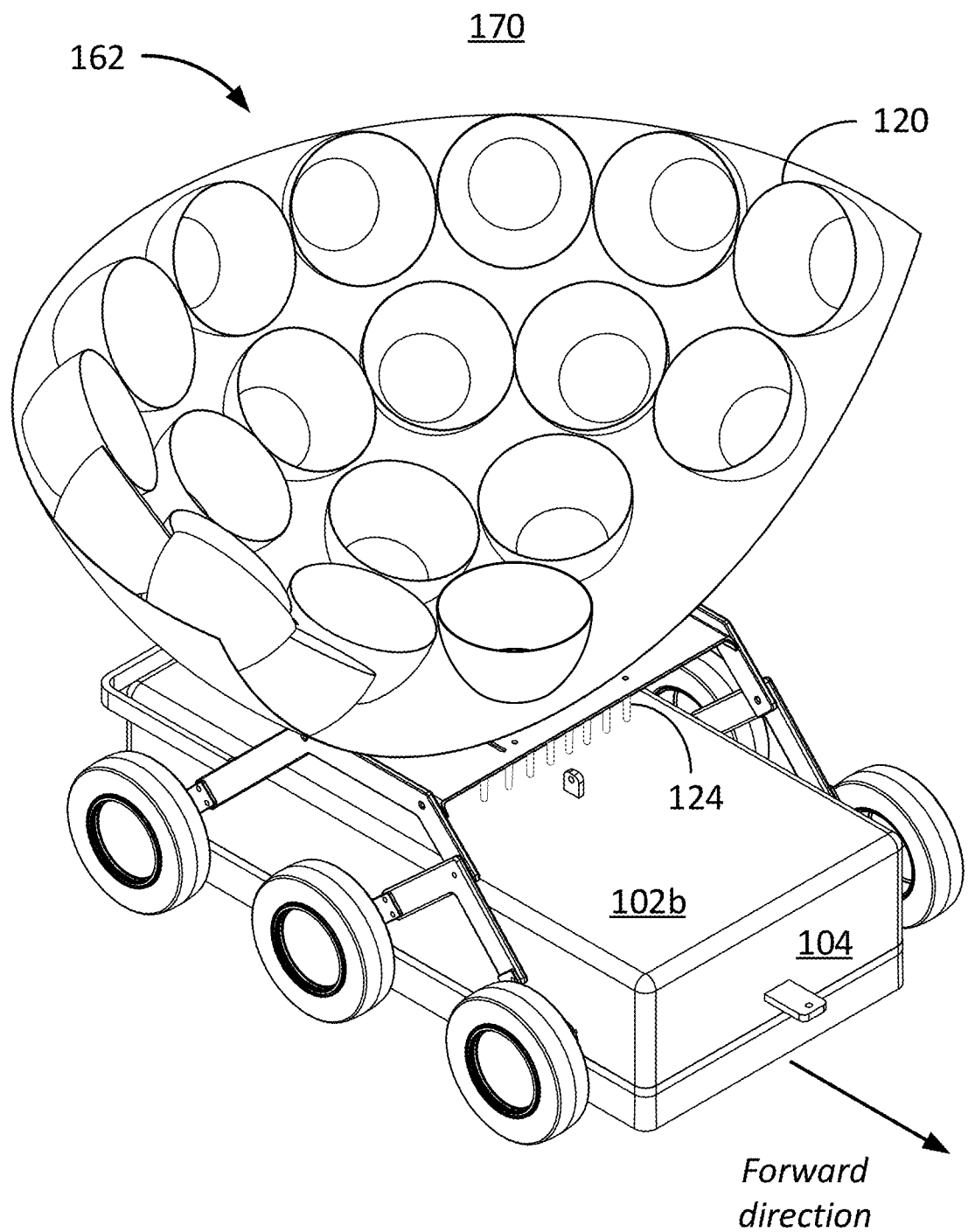

Referring to the drawings in general, FIGS. 1A-1D are line drawings of a compound parabolic concentrator and gas collection arrangement constructed in accordance with embodiments of the present invention. FIG. 1A is an isometric view of a compound parabolic concentrator and gas collection arrangement 100 depicting a full semi-spherical convex compound parabolic concentrator (CPC) array 122 disposed on a rover wagon 102*b*. Certain embodiments envision photo voltaic solar (PV) panels 216 being disposed in the spaces, or gaps, between the CPCs 120 to passively generate electricity for the transporter 102*a*. Though there are only three PV panels 216 shown here, there can be enough PV panels 216 to fit between all the outer bowl rims 134 of the CPCs 120. Each CPC 120 comprises a bowl aperture 139 at the bowl apex 136 in the bottom of the CPC bowl 130. The bowl apertures 139 are not depicted in the other figures for sake of simplicity but are nonetheless an integral part of the CPC 120. FIG. 1B is an isometric view of an optional CPC and gas collection arrangement 150 depicting a half semi-spherical convex CPC array 122b disposed on a rover wagon 102b. This further shows the fiberoptic cables 124 extending from the CPCs 120 into the wagon body 104 of the rover wagon 102b. FIG. 1C is an isometric view of yet another optional CPC and gas collection arrangement 160 depicting a full semi-spherical concave CPC array 162 disposed on a rover wagon 102b. FIG. 1D is an isometric view of still another optional CPC and gas collection arrangement 170 depicting a half semi-spherical concave CPC array 162b disposed on a rover wagon 102b with the fiberoptic cables 124 extending from the CPCs 120 into the body of the rover wagon 102b. The concepts of the embodiments of FIGS. 1A-1D are described with respect to forgoing embodiment.

Figure 2A:
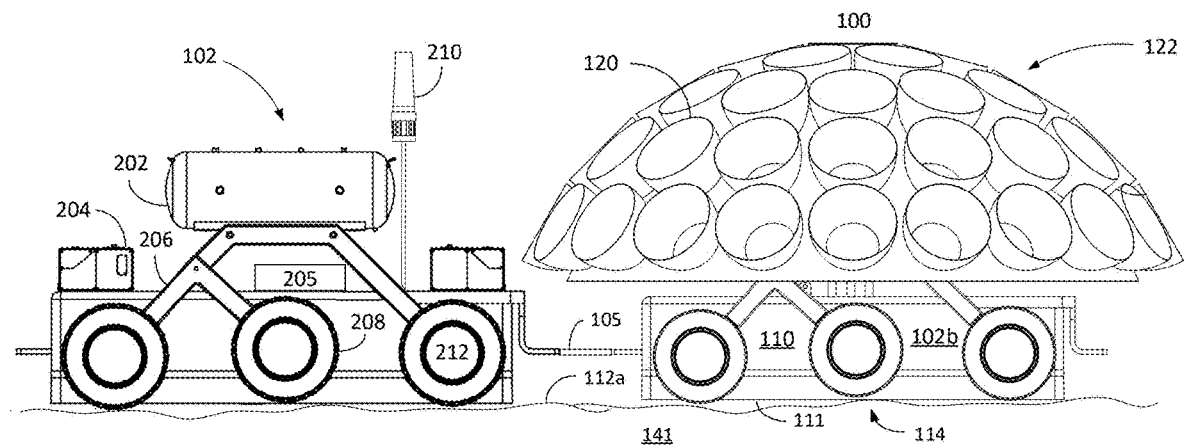
FIGS. 2A and 2B are line drawings of different perspectives of a rover pulling a wagon carrying a CPC and gas collection arrangement in accordance with embodiments of the present invention.
Figure 2B:
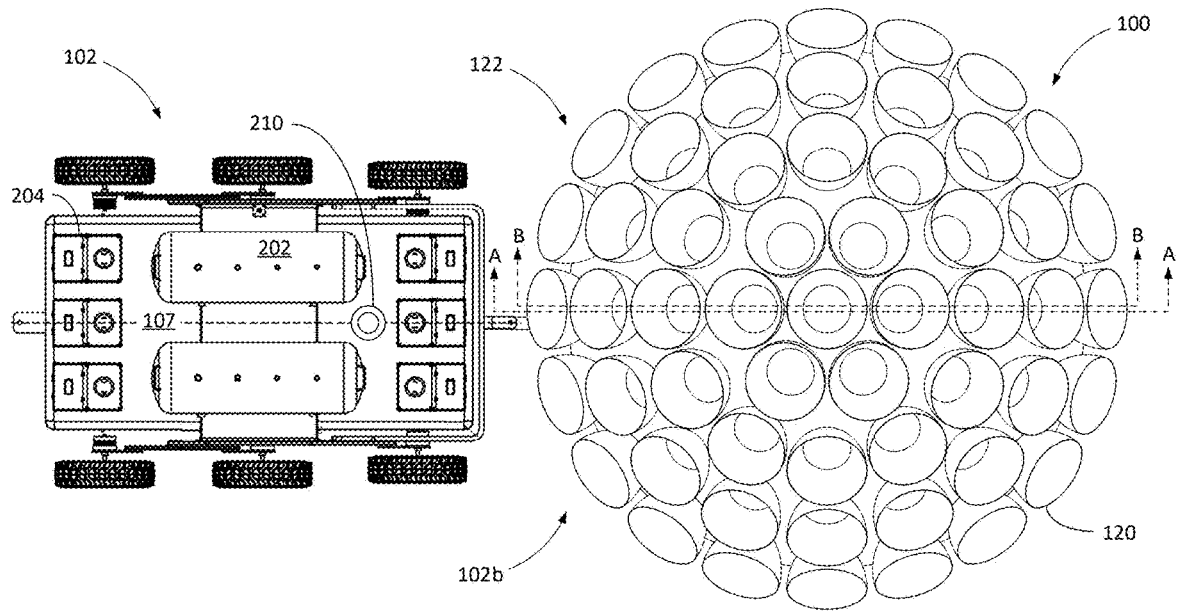

FIGS. 2A and 2B are line drawings of different perspectives of a rover 102 pulling a wagon 102b carrying a CPC and gas collection arrangement 100 in accordance with embodiments of the present invention. Though the wagon 102a is the transporter 102a supporting or otherwise carrying the CPC and gas collection arrangement 100, the transporter 102a can be a rover 102, a robot or human carried platform or some other support structure that is arranged to support CPCs 120 in a manner that accomplishes the tasks described herein.

FIG. 2A is a side view of the CPC and gas collection arrangement 100, depicting the rover 102 connected or otherwise linked to the wagon 102b via a hitch linkage 105. The CPC and gas collection arrangement 100 is depicted with the semi-spherical convex CPC array 122 mounted on the rover wagon 102b. Both the rover wagon 102b and the rover 102 comprise a cover rim 111 configured to essentially press (or somewhat seal) against the granular surface 112a (which when referring to the moon 141, is regolith surface) to form the shielded environment 114 inside of the cover 110. Some embodiments envision the rover 102 not comprising a shielded environment but rather used to simply pull one or more wagons 102b around the surface of the moon 141 or some other extra-terrestrial body. The shielded environment 114 is essentially the same volume as the internal volume of the cover 110 defined from the inside cover top 107c to the cover rim 111, which by convention will also have the callout 114.

With respect to the rover 102, general components can include supporting elements that provide all necessary power and functionality needed to operate the rover 102 and the wagon 102b. This includes cryogenic fluid tanks and pumping system 202, a battery system 204, communication system 210, computer system 205, etc. The cryogenic fluid tanks and pumping system 202 (as viewed in conjunction with FIG. 3A) can provide a cooling liquid to cool condensation plates 115 in the gas collection system 118. A cryogenic liquid pumping station 117, that can be connected to the cryogenic fluid tanks 202 via fluid carrying lines (not shown), circulates cryogenic fluid through conduits 119 either encased in/or lining the gas condensation plates 115. Gaseous atoms and molecules that are liberated from the regolith 112 (via heat, for example) condense on the cryogenically cooled gas condensing plates 115 inside of the shielded environment 114.

With continued attention to FIG. 2A, the rover 102 can comprise a battery system 204 that can include one or more batteries that can be rechargeable by photo-voltaic panels or some internal generator that uses fuel, or some combination thereof. The communications system 210 can be a wireless communicator that uses RF, laser, IR or some other wireless communications means understood by those skilled in the art. The computer system 205 generally includes a central processing unit, processors, volatile/transient and non-transient memory, etc., and can function within a computer area network contained within the rover 102 and CPC and gas collection arrangement 100. Electric driving motors 212 can be built into the wheel hubs to spin the wheels 208 (or tracks) that propel the rover 102 around the surface 112a. The suspension system 206 provides flexibility to the drivetrain to navigate over uneven terrain for the rover 102, and wagon 102b.

FIG. 2B is a top view line drawing of the rover 102 pulling the wagon 102b carrying the CPC and gas collection arrangement 100. The rover 102 presents the top surface 107 of the rover 102 calling out the cryogenic liquid tanks 202, batteries 204 and the communication system 210. The CPC and gas collection arrangement 100 is sectioned by two cross-section lines AA and BB through a plurality of CPCs 120 along the center of the wagon 102b.

Figure 3A:
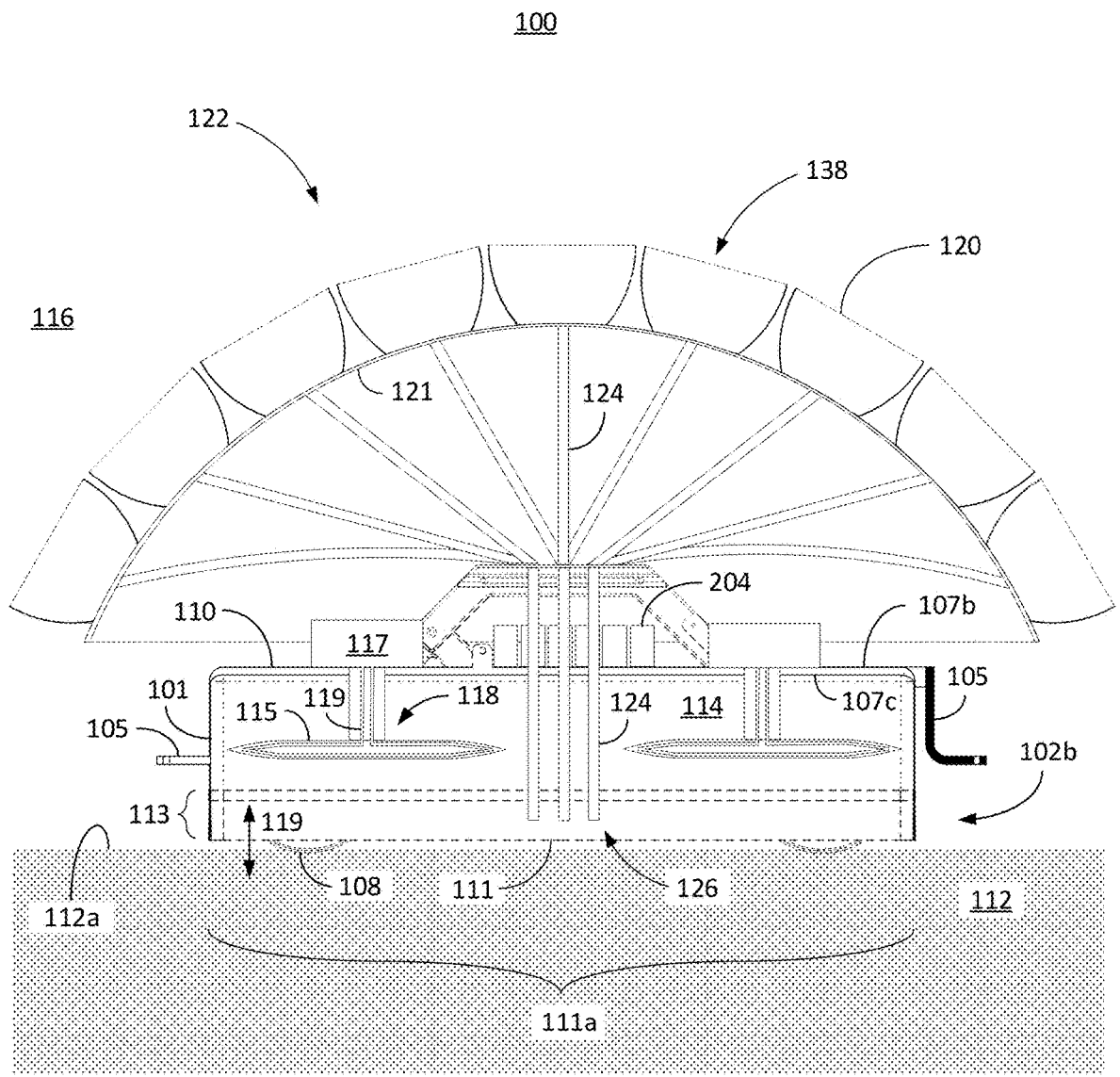
FIG. 3A is a line drawing of the CPC and gas collection arrangement of FIG. 1A between the cross-section lines AA and BB (of FIG. 2B) constructed in accordance with embodiments of the present invention.

FIG. 3A is a line drawing of the CPC and gas collection arrangement of FIG. 1A between the cross-section lines AA and BB (of FIG. 2B) constructed in accordance with embodiments of the present invention. As depicted, the CPC and gas collection arrangement 100 generally includes a transporter that supports a convex CPC array 122, which is configured to concentrate and direct solar energy as heat to granular soil 112 within the footprint 111a of a shielded environment 110. The dashed lines depict components of interest that are not between the cross-section lines AA and BB.

Figure 4A:
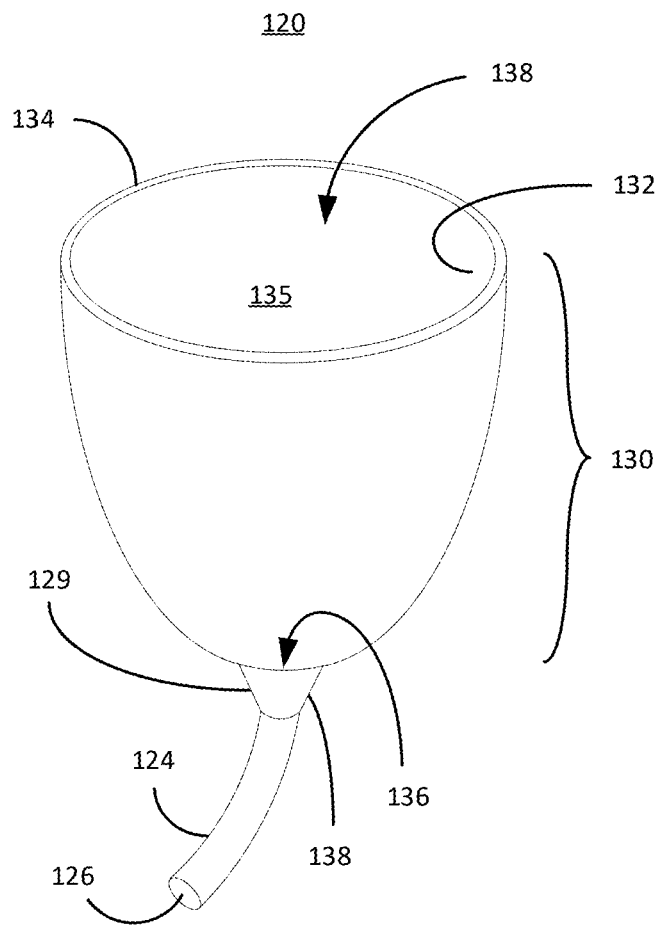
FIG. 4B is a line drawing of a CPC cross-section depicting soler energy concentration consistent with embodiments of the present invention.
FIG. 4C is a line drawing of a compound parabolic concentrator array cross-section in a convex arrangement consistent with embodiments of the present invention.
Figure 4B:
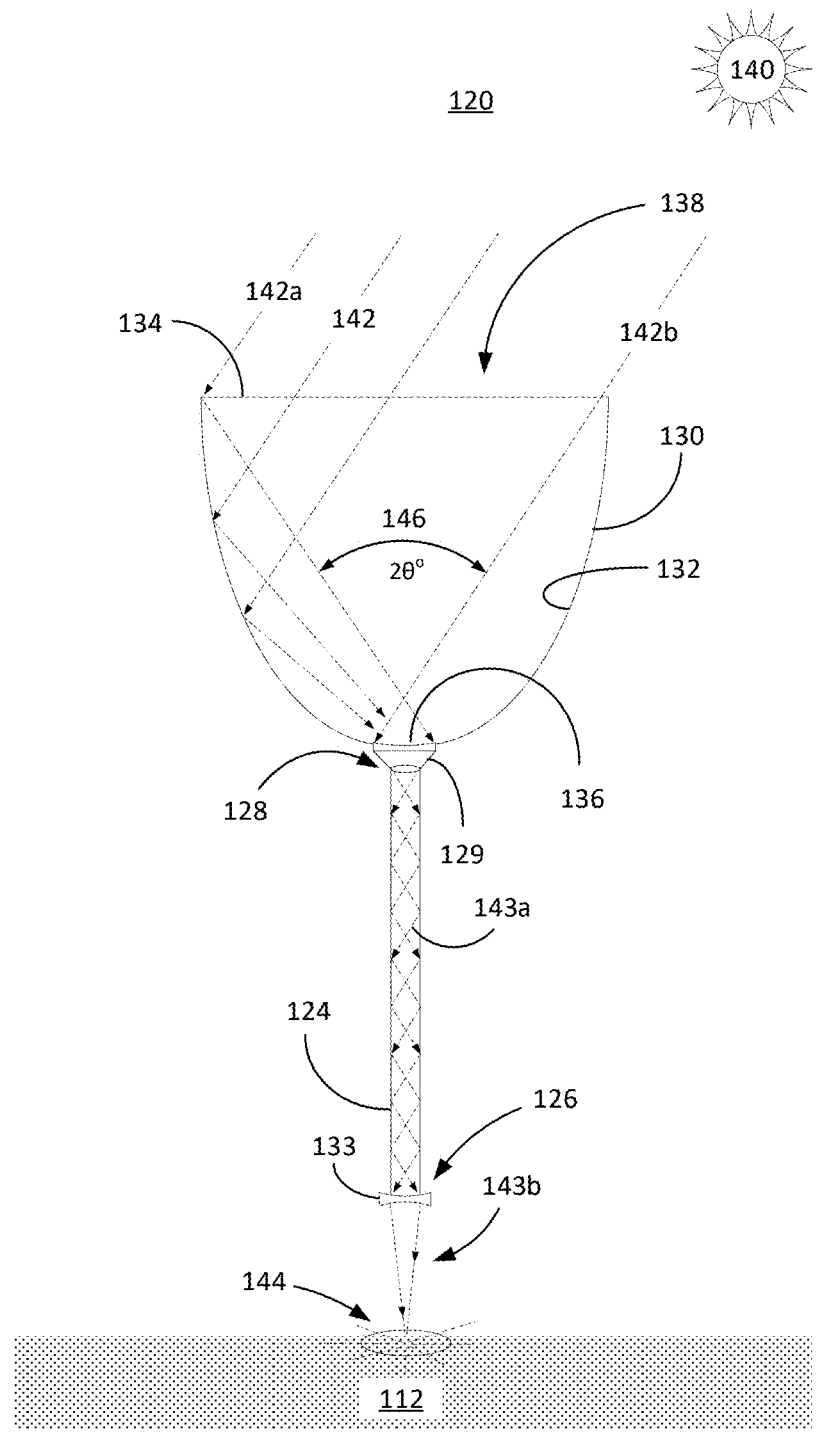
Figure 4C:
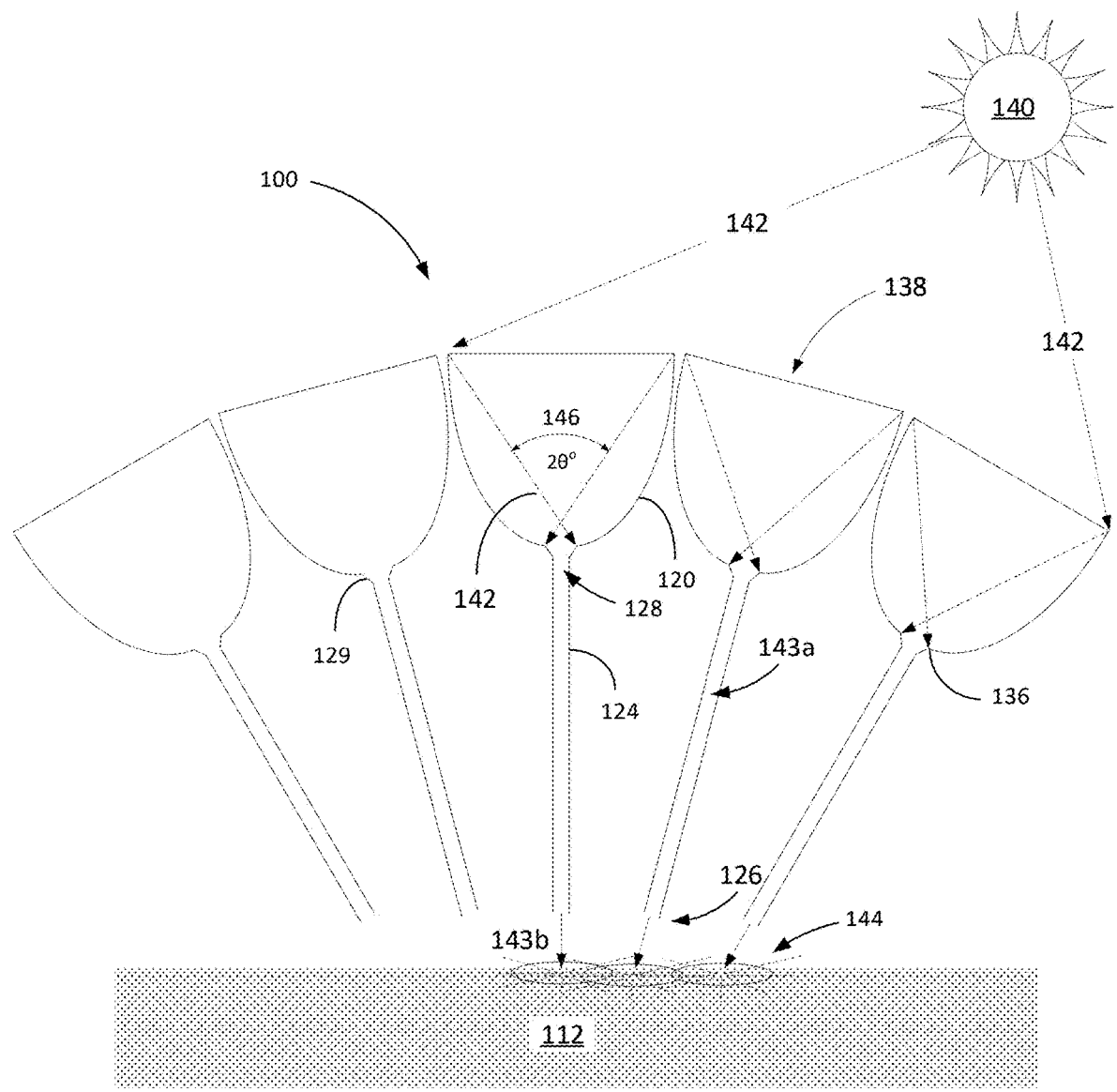

As viewed with respect to FIGS. 4B and 4C, the convex CPC array 122 comprises a plurality of CPCs 120 distributed in an arched/non-planar arrangement. The CPCs 120 can be disposed along a semi-spherical frame 121 that is an armature that supports the plurality of CPCs 120. Each CPC 120 is configured to capture solar energy 142 and direct the solar energy in a concentrated form 143a into an inlet end 128 of a fiberoptic light cable 124 (also known as a light pipe). The concentrated solar energy 143a is transferred through the fiberoptic cable 124 and emitted from the outlet end 126 of the fiberoptic cable 124 as a heat beam that is directed at the regolith 112. The outlet end 126 is disposed within the internal volume/shielded environment 114. The shielded environment 114 is defined by and within the cover 110 when resting atop the regolith 112, which happens to be essentially the same volume as the internal volume of the cover from the inside cover top 107c to the cover rim 111. In this embodiment, the cover 110 extends (via cover sides 101, in this configuration) from the inside of a cover top 107c towards the regolith surface 112a. In certain embodiments, the cover 110 can include a pliable or moveable skirt 113, which can actuate towards or away from the regolith surface 112a, as shown by the arrow 119. Here, the skirt 113 is at least somewhat retracted to allow clearance for the wagon 102b to roll over the regolith 112 (as shown by the wheels 108 partially revealed). In this embodiment the distal rim of the moveable skirt 113 serves as the cover rim 111. The cover rim 111 is configured to seal against the regolith surface 112a, thereby creating the shielded environment 114 within the cover 110. The cover rim 111 defines the footprint 111a of the shielded environment 114. The shielded environment 114 (internal volume) is only in communication with the outside environment 116 when the cover rim 111 is not in contact with the regolith surface 112a. Accordingly, a high heat light concentrated beam 143b from the concentrated solar energy 143a is emitted from each fiberoptic outlet ends 126 and directed to regolith 112. Gaseous elements trapped in the regolith 112 are liberated when temperatures exceed their liberation threshold, which for some elements and molecules is between 600° C.-1000° C. The liberated gaseous elements contained in the internal environment 114 can then be collected by gas collectors 115 inside of or at least in fluid communication with the internal environment 114 (i.e., in a separate container having an environment that can receive the gases from the internal environment 114).

In this embodiment, the wagon 102b supports the cryogenic liquid pumping station 117 and batteries 204, which are bolted or otherwise attached to the wagon's top surface 107b. The cryogenic liquid pumping station 117 circulates cryogenic fluid (received from the cryogenic liquid tanks 202 on the rover 102) through the liquid cryogen carrying conduits 119, which in this embodiment run through the gas condensation plates 115.

Figure 3B:
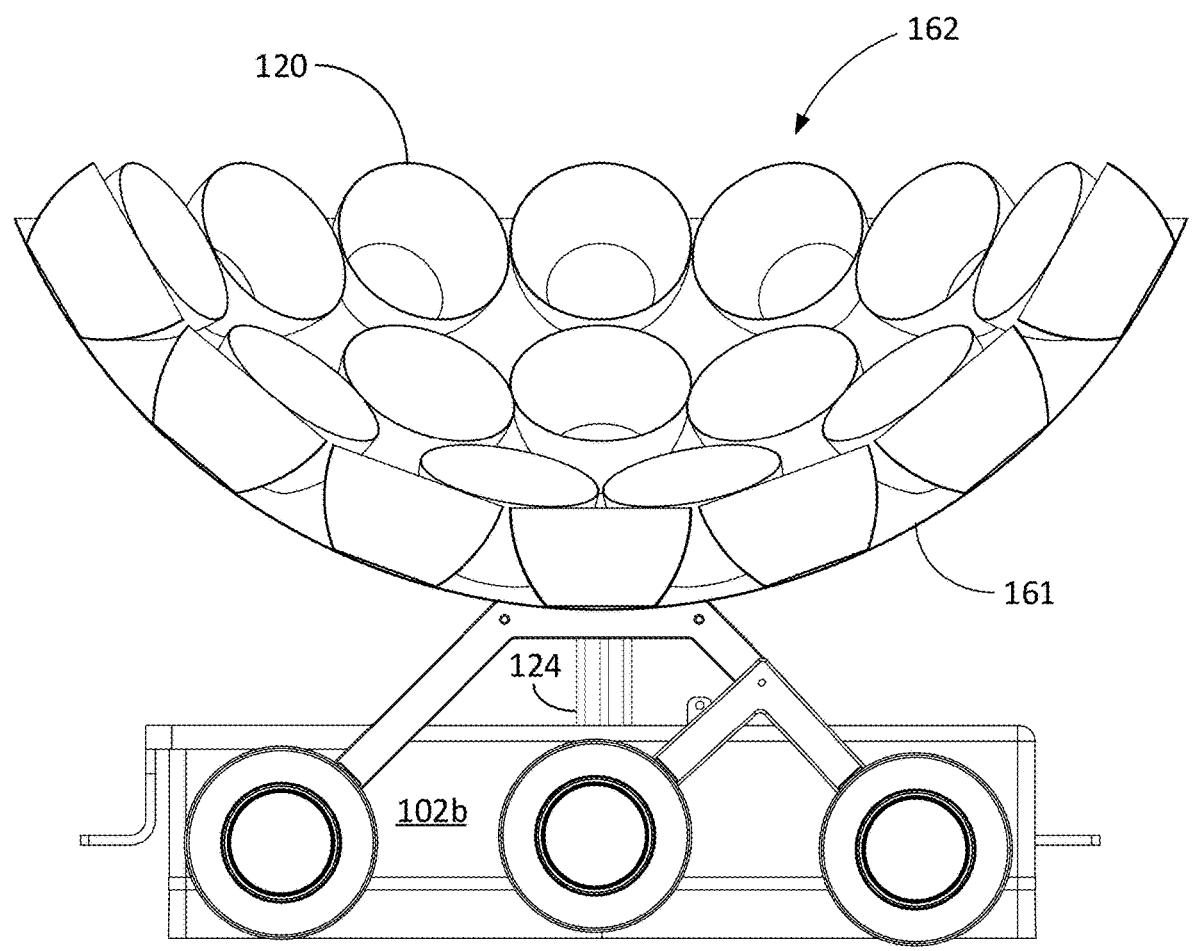
FIG. 3B is a line drawing illustratively depicting a cross section of the CPC and gas collection arrangement of FIG. 1C constructed in accordance with embodiments of the present invention.

FIG. 3B is a line drawing illustratively depicting a cross section of the CPC and gas collection arrangement 160 of FIG. 1C constructed in accordance with embodiments of the present invention. As shown, the concave curved CPC array 162 is arched in a concave arrangement. Here, the CPCs 120 are disposed along a concave semi-spherical frame 161, which is adapted and arranged as an armature to support the plurality of CPCs 120. The concave curved CPC array 162 can be static or optionally dynamically moved to follow the sun 140 as depicted in FIGS. 2C and 2D.

Figure 3C:
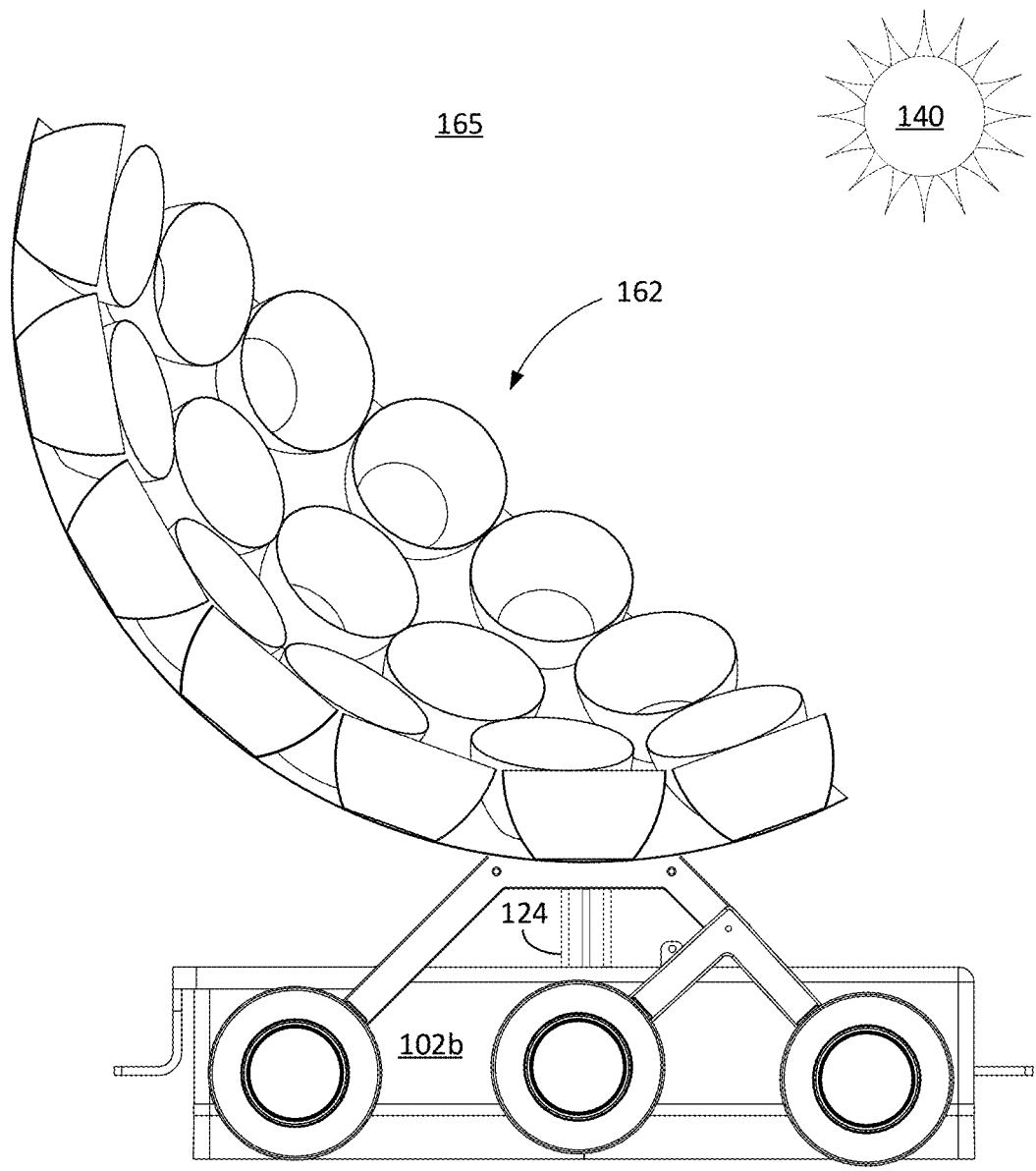
FIGS. 3C and 3D are line drawings illustratively depicting cross-sections of an embodiment of a motorized convex CPC arrangement in two different positions on a wagon consistent with embodiments of the present invention.
Figure 3D:
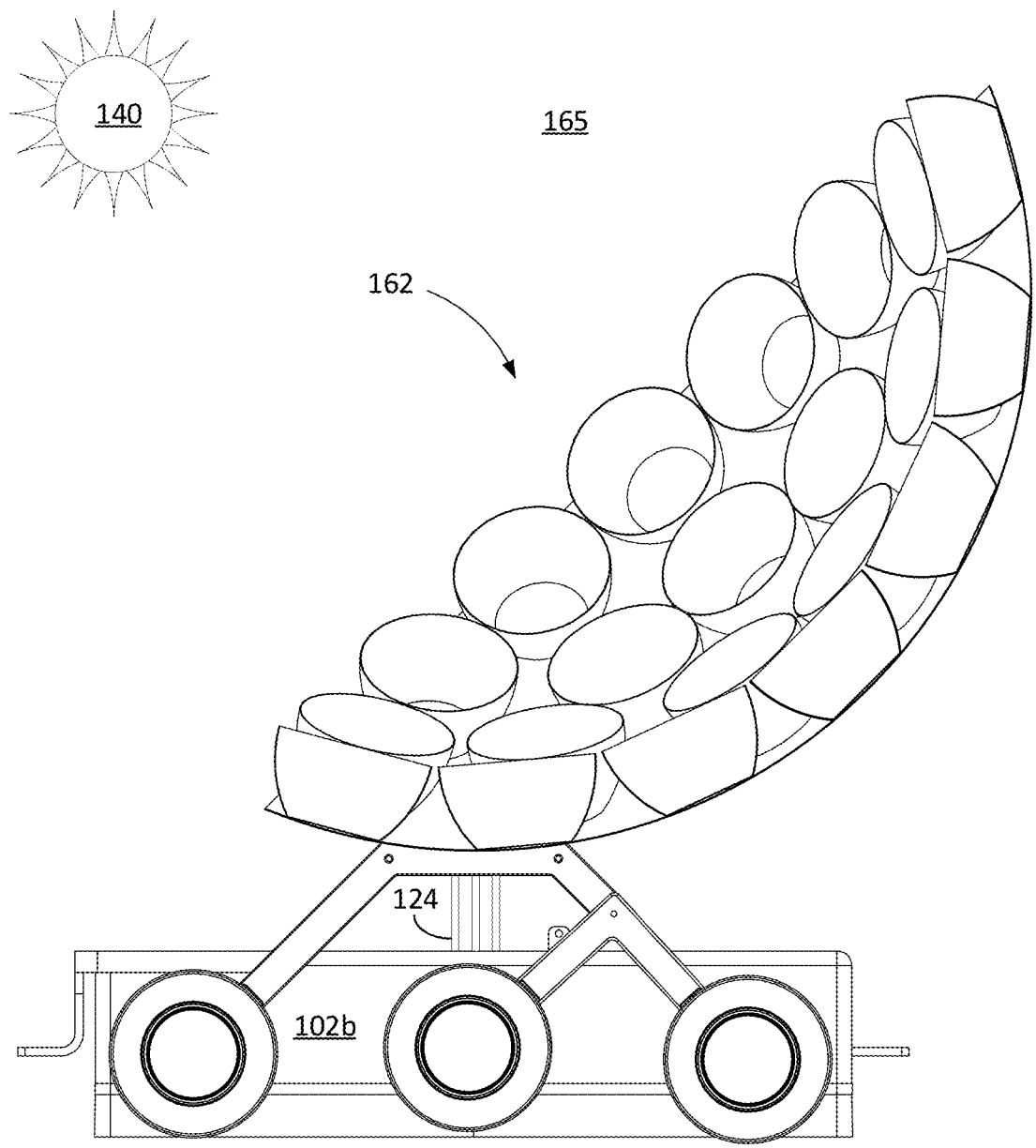

FIGS. 3C and 3D are line drawings illustratively depicting cross-sections of an embodiment of a motorized convex CPC arrangement 165 in two different positions on a wagon 102b consistent with embodiments of the present invention. As shown in FIG. 3C the concave curved CPC array 162 is angled to more efficiently collect solar energy from the sun 140 when the sun 140 is behind the wagon 102b, or when the sun 140 is in front of the wagon 102b, as shown in FIG. 2D. The concave curved CPC array 162 can be moved by a motor (not shown) from the direction depicted in FIG. 3C to that of FIG. 3D.

Figure 3E:
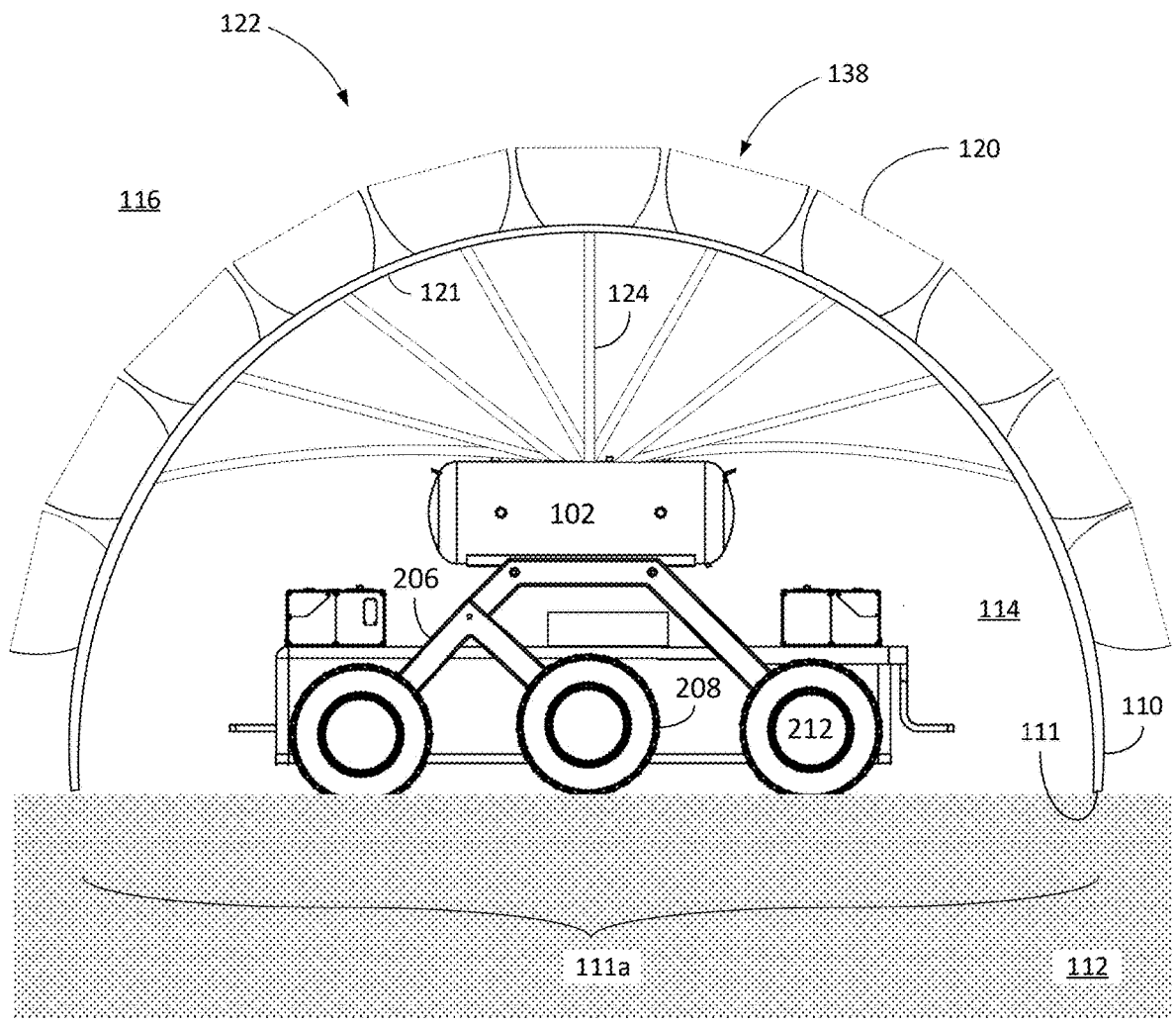
FIG. 3E is a line drawing illustratively depicting a side view of another CPC and gas collection arrangement with a convex array doubling as a cover consistent with embodiments of the present invention FIG. 4A, in view of FIG. 4B, is a line drawing of an isometric view of a CPC and fiberoptic cable arrangement consistent with embodiments of the present invention.

FIG. 3E is a line drawing illustratively depicting a side view of another CPC and gas collection arrangement with a convex array doubling as a cover consistent with embodiments of the present invention. Here, the convex frame 121 functions as the cover 110 with a cover rim 111 that is configured to move towards (and away from) the regolith 112 until it seals against the regolith 112 thereby creating an internal environment 114 that is not in fluid communication with the exterior environment 116 because the regolith 112 is blocking the fluid communication wherein fluid can pass through freely. Accordingly, many of the other attributes in the previous embodiments can be superimposed or otherwise implemented in the embodiment of FIG. 3E without departing from the scope and spirit of the present invention.

FIG. 4A, in view of FIG. 4B, is a line drawing of an isometric view of a CPC 120 and fiberoptic cable 124 arrangement consistent with embodiments of the present invention. As shown, in this configuration, the CPC 120 comprises a concave reflective bowl 130 that is defined between a bowl rim 134 and a bowl apex 136. The concave reflective bowl 130 is configured to receive sunlight through a CPC inlet aperture 138 defined by the bowl rim 134, wherein sunlight 140 is reflected to the bowl apex 136 at the bowl apex 136 via the reflective parabolically shaped inner surface 132. The parabolically shaped inner surface 132 is defined by a 2-D parabola that is rotated in 3-D along the parabola base, or vertex. Certain embodiments envision the concave reflective bowl 130 comprising a reflective inner surface 132 with a refractive index of at least 1.4, which in some embodiments is a mirror. Here, the bowl interior 135 is parabolically shaped to best direct (reflect) the sunlight in a concentrated form to the bowl apex 136 where a light concentrator lens 129 further concentrates the light, which is transmitted to the fiberoptic inlet end 128. The fiberoptic inlet end 128 comprises a fiberoptic inlet end 128 (also referred to as a light pipe aperture) that receives the concentrated sunlight 143a and transmits down the length of the fiberoptic cable 124. The fiberoptic cable 124 channels concentrated light 143a to a fiberoptic outlet end 126 where the concentrated light 143a can be emitted as a further concentrated beam of light 143b.

FIG. 4B is a line drawing of a CPC cross-section depicting soler energy concentration consistent with embodiments of the present invention. The cross-section of the CPC 120 depicts the solar energy 142 from the sun 140 being received through the collector opening/orifice 138 and reflected off the reflective sides 132 to the light concentrator lens 129 at the bowl apex 136. An aperture in the bowl apex 137 directs the solar energy 142 reflected from the bowl inner sides 132 to the light concentrator lens 129, which further concentrates the light 143a to the fiberoptic inlet end 128. The acceptance angle 20° 146 of the concave reflective bowl 130 is defined by the diameter of the bowl rim 134. This determines how much solar energy 140 can be collected, as depicted by the limits of light diameter points 142a and 142b. The parabolic shape of the concave reflective bowl 130 is curved to direct and concentrate essentially all the solar energy 142 to the light concentrator lens 129, as depicted by the reflected angle of the sun's light 142 bouncing off the reflective inner surface 132. As mentioned, the light concentrator lens 129 focuses the light received from the bowl apex 136 into a further concentrated light 143a that is channeled into the fiberoptic inlet end 128. The concentrated light 143a bounces off the inner surface of the fiberoptic cable 124 through the fiberoptic outlet end 126 where it is emitted. In this embodiment, there is a secondary concentration lens 133 at the fiberoptic outlet end 126, which focuses the concentrated light 143a into a high heat light concentrated beam 143b having a focal point on the regolith 112. The secondary concentration lens 133 can include a collimating lens, or lens portion, at the fiberoptic outlet end 126, which causes the emitted light 143b to be parallel followed by a focusing lens, which causes the parallel light to converge on a focal point. The regolith 112 is heated by the high heat light concentrated beam 143b, which releases gaseous elements and molecules (gaseous material) from the regolith 112 in the heated region 144, as shown. The released or otherwise liberated gaseous material migrates into the shielded environment 114 where it is condensed on the gas condensation plates 115 for harvesting.

FIG. 4C is a line drawing of a compound parabolic concentrator array cross-section in a convex arrangement 100 consistent with embodiments of the present invention. As shown, there are a plurality of CPCs 120 that are distributed along a convex arch, wherein three of the CPCs 120 are positioned to receive sunlight 142 from the sun 140 via their respective CPC inlet apertures 138. The left two CPCs 120 are not positioned to receive sunlight 142 from the sun 140 based on the angle of the sun 140. The three CPCs 120 to the right capture and direct the sunlight 140 to the bowl apex 136 where the sunlight 142 is concentrated via the light concentrator lens 129. The concentrated light 143a is piped down to the fiberoptic outlet end 126 where it is emitted as a high heat light concentrated beam 143b at the three far right fiberoptic outlet ends 126. The high heat light concentrated beam 143b heats a region 144 of the regolith 112 at sufficient heat to release the gaseous materials trapped in the regolith 112. In some embodiments, the region 144 is heated to a temperature that is between 600° C.-1000° C.

Certain embodiments envision the fiberoptic outlet ends 126 being arranged in a line or several lines to heat the regolith 112 in a select region under the high heat light concentrated beams 143b. One method envisions the rover 102 being stationary with the cover rim 111 on the surface 112a for enough time for the gas to be liberated from the regolith 112 and collected on the gas condensation plates 115. The cover rim 111 is then retracted 119 allowing the wagon 102b to be pulled to a new location to mine fresh regolith 112. An optional embodiment envisions the fiberoptic outlet ends 126 being actuated by a motor (not shown) to sweep over a larger area of the regolith 112 reducing the amount of raising and lowering the cover rim 111. Another embodiment envisions the cover rim 111 being a sled that does not need to be raised and lowered, wherein the rover 102 is in constant forward motion with the high heat light concentrated beams 143b sweeping continuously over the regolith 112.

Certain embodiments envision a method wherein a CPC and gas collection arrangement comprises an array of CPCs 120 arranged to confront the sun 140 in a manner that essentially permits all or the majority of the CPCs 120 to collect sunlight 142. For example, consider the CPC and gas collection arrangement 150 of FIG. 1B, which comprises a half semi-spherical convex CPC array 122b disposed on a wagon 102b. Due to its mobility, the wagon 102b can be positioned with the CPCs 120 essentially optimally pointing towards the sun 140. In one method embodiment, shown in FIG. 1B, the CPC and gas collection arrangement 150 is pointed in the east towards the rising sun 140 with the rover 102 traversing the moon 141 in western direction, thereby harvesting gases from the regolith 112 as the wagon 102b sweeps across the surface 112a. The CPC and gas collection arrangement 150 is then turned around with the CPC array 122b pointing in the west towards the setting sun 140 with the rover 102 traversing the moon 141 in an eastern direction. Because the sun 140 takes approximately 2 weeks to traverse the lunar sky, the CPC and gas collection arrangement 150 can be employed to mine the moon 141 in one direction for the first week and the other direction for the second week of a solar-lunar cycle.

Figure 5A:
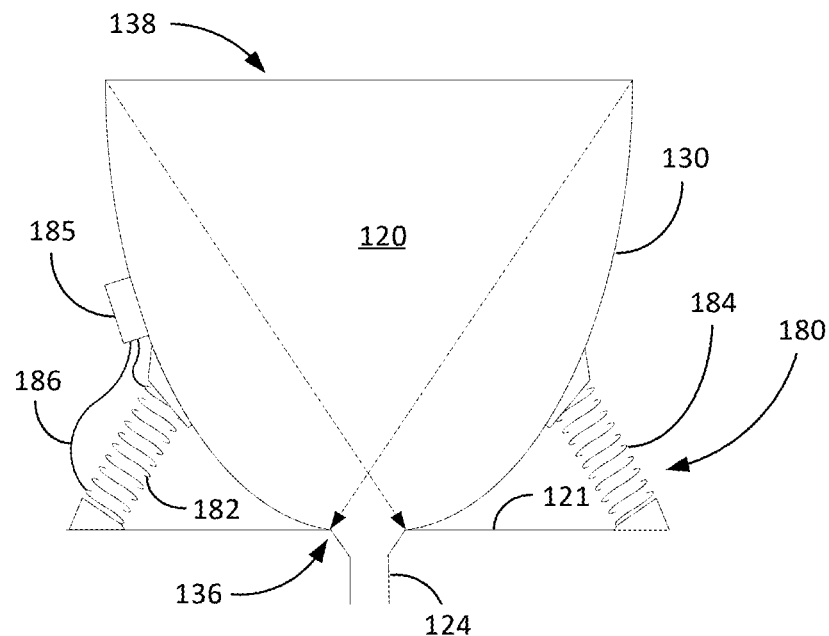
FIGS. 5A and 5B are line drawings illustratively depicting a redirecting spring and nitinol deflector consistent with embodiments of the present invention.
Figure 5B:
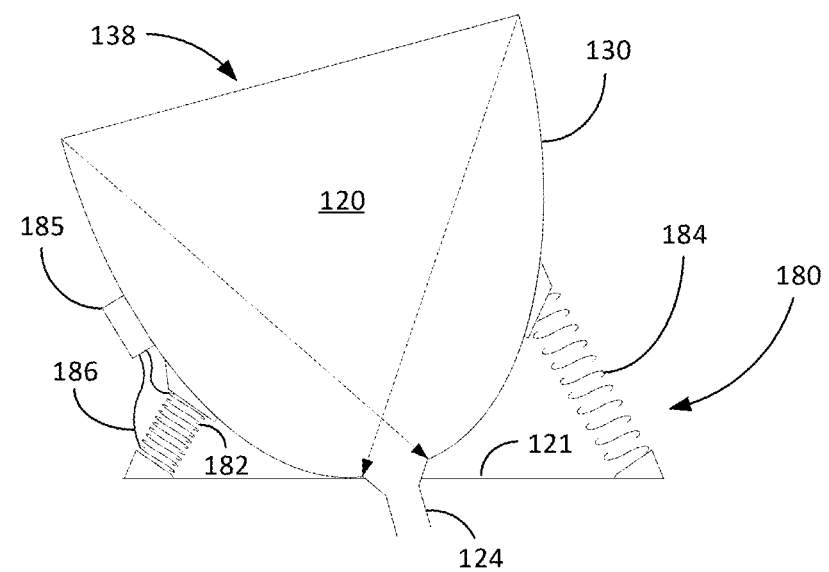

FIGS. 5A and 5B are line drawings illustratively depicting a redirecting spring and nitinol deflector 180 consistent with embodiments of the present invention. As shown, at least one of the plurality of CPCs 120 is connected to a redirecting spring and nitinol deflector 180 that is configured to move at least one CPC 120 towards the sun 140 as it traverses above the wagon 102b. The outside of the concave reflective bowl 130 is connected to the frame 121 via a nitinol coil 182 on the left side of the bowl 130 and a standard spring 184 (such as a steel spring or titanium spring, etc.) on the right side of the bowl 130. A voltage source 185 is electrically connected to the ends of the nitinol coil 182 via electrical transmission lines 186. Nitinol is a shape memory alloy wherein a nitinol structure, such as the nitinol coil 182, is formed or otherwise set into the compressed coil shape at a temperature around 500° C. In a relaxed state, the coil may be stretched with little resistance but when reheated to its transition temperature, which can be as low as 40° C., the nitinol coil 182 will return to its set coil shape.

As shown in FIG. 5A, the nitinol coil 182 is in a relaxed state wherein the spring 184 comprises enough force to pull the CPC 120 in a first position, which in this embodiment is when the CPC inlet aperture 138 is facing upwards. While in the relaxed state, the voltage source 185 is not providing any current to the nitinol coil 182.

As shown in FIG. 5B, the nitinol coil 182 is compressed in its memory set state, which is accomplished by heats the nitinol coil 182 above its transition temperature with current supplied to the ends of the nitinol coil 182 via the electrical transmission lines 186. The heated nitinol coil 182 is stronger than (i.e., overcomes) the spring force of the spring 184 thereby pivoting the CPC 120 at the bowl apex 136 into a second position tipping the CPC inlet aperture 138 to the left. In this way, the CPC can be made to better confront the sun 140 thereby improving the solar energy collection to generate heat from the sunlight transmission down the fiberoptic cable 124.

The redirecting spring and nitinol deflector 180 is one embodiment of a CPC deflector arrangement, which could be accomplished by a hydraulic piston arrangement or motor and linkage assembly to move the CPC 120 to track the sun 140. One advantage that the redirecting spring and nitinol deflector 180 has over these other optional embodiments is that the nitinol and spring have no friction interfacing surfaces, which might wear due to the abrasive nature of regolith dust.

Another embodiment presented herein that can be used with the CPC arrangement, or optionally be used without the CPC arrangement as a stand-alone system, is a heat recovery arrangement for collecting vaporized gas trapped in regolith. The heat recovery arrangement generally comprises a rover that carries heat recovery elements that cooperate with a primary heat source. The heat recovery elements include a preheat contact element that preheats a region of regolith before the region is brought to high heat configured to liberate target gases in the regolith by the primary heat source. As the rover moves forward, the preheat contact element receives heat collected from the high heat region via a heat recovery sled that moves in contact with the high heat region. Heat is transferred between the heat recovery sled and the preheat contact element via a heat transfer medium that circulates through the heat recovery sled and preheat contact element.

Figure 6A:
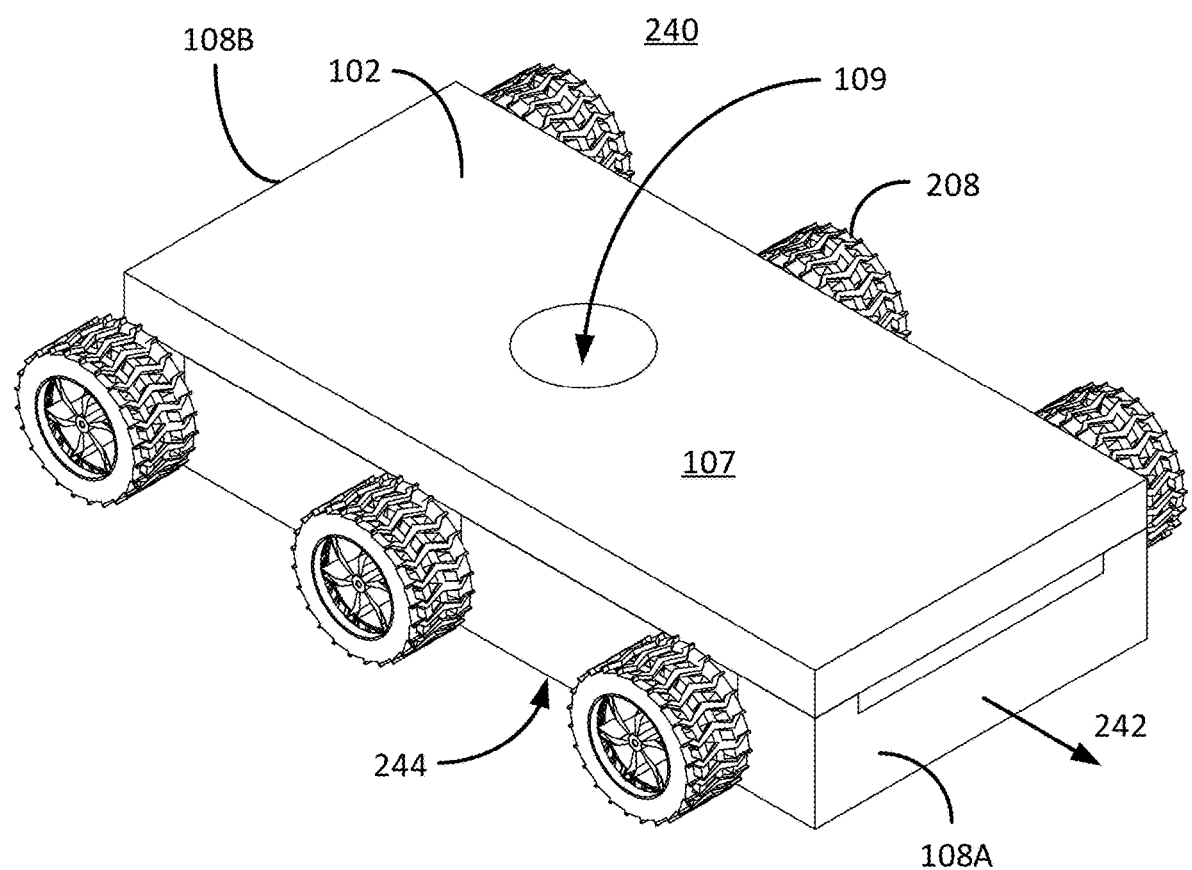

FIGS. 6A-6G are line drawings illustratively depicting a heat recovery arrangement 240 that can be used in conjunction with the CPC and gas collection arrangement 100 consistent with embodiments of the present invention. FIG. 6A illustratively depicts a block diagram of an isometric line drawing of a rover 102 showing the six rover wheels 208, a heating element port 109 in the rover top 107 and the rover front end 108A and back end 108B. As shown by arrow 242, the rover 102 moves in a (forward) direction leading with the front end 108A and trailing with the rear end 108B. Described in more detail below are heat recovery elements 250 located under the rover 102, i.e., located at the rover underside 244.

Figure 6B:
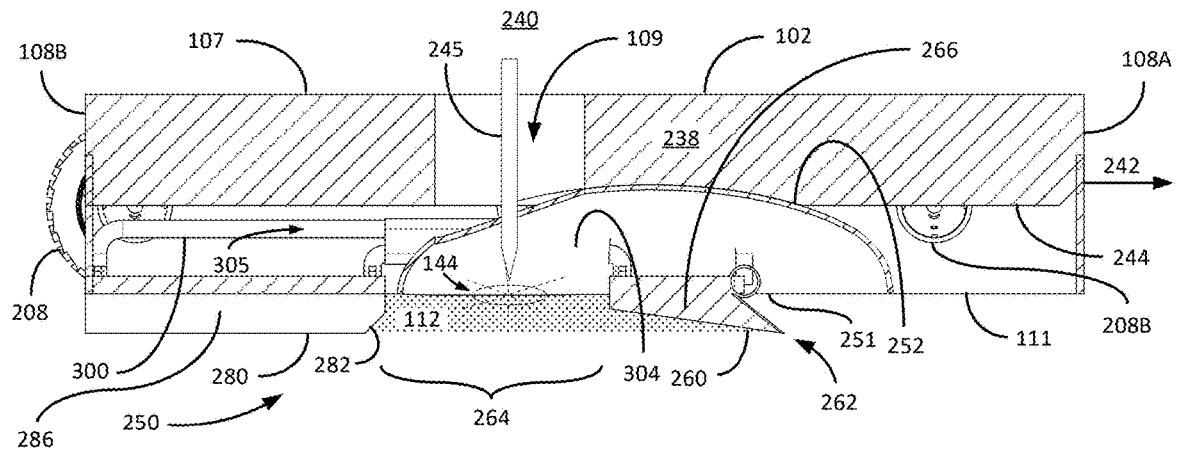

FIG. 6B is a side view cross-section line drawing of the heat recovery arrangement 240 consistent with embodiments of the present invention. The rover 102 is shown as a block diagram configuration for simplification. For example, the core portion 238 of the rover 102 is depicted as being a solid block between the top surface 107 and the underneath side 244 with a heat element port 109 passing therethrough.

In actuality, however, the rover cover 102 will likely be sheet metal, carbon fiber, or some other suitable light weight material shell which includes other elements (not shown) taking up the space, such as cryogenic gas collection surfaces equipped to collect gas captured in the gas collecting shield 252. The gas collecting shield 252 is configured to either rest on the regolith 112, or some other granular soil surface, or be in close proximity to the regolith surface, such as within a fraction of an inch. For reference, a rover wheel 208 is shown extending from the rover rear end (trailing edge) 108B in addition to the wheel hubs and axle system 208B shown under the core portion 238. In operation, the heat recovery arrangement 240 takes advantage of heat collection when the rover 102 is moving in a forward direction as indicated by the arrow 242.

Figure 6C:
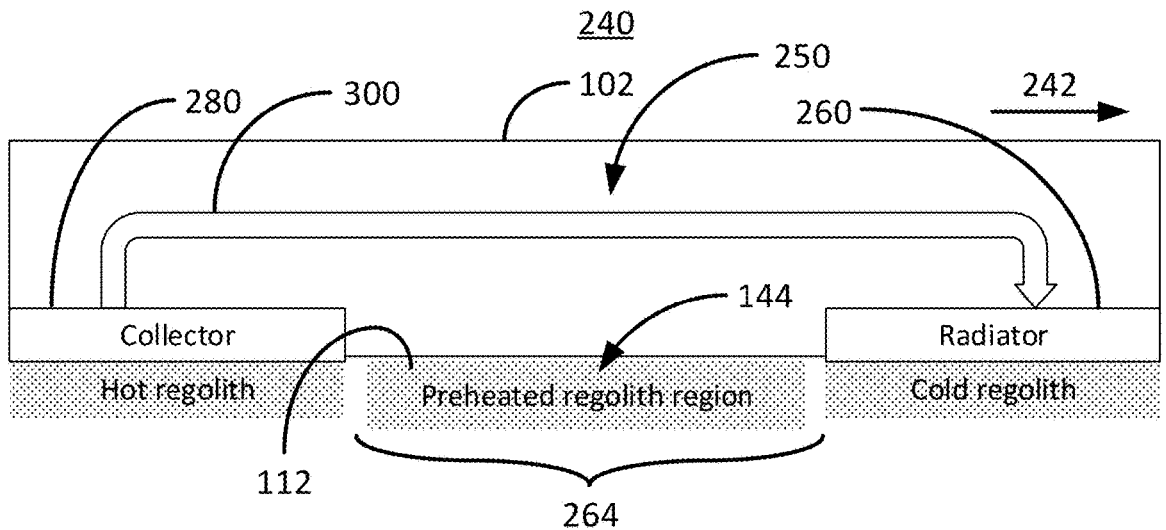

FIG. 6C is a block diagram of the heat recovery/exchange arrangement 240 described in view of FIG. 6B. The heat recovery elements 250 are configured to preheat a region of regolith 144 before that region of regolith 144 is brought up to a target temperature via a primary heating source 245. The target temperature being high enough to liberate target gases, such as He-3, trapped in the regolith 112. By preheating the region 144 prior to using the primary heating source 245, the amount of energy needed to bring the region 144 up to the target temperature is reduced, which conserves energy in the system 240. In other words, the change in temperature between starting temperature and target temperature (in the gap 264) is lowered thereby lowering the energy required to liberate the target gases from the regolith 112.

The heat recovery elements 250 are arranged to recover heat from the heated region 144 and reuse the recovered heat to preheat a new region that will soon be subjected to heat from the primary heating source 245. Hence, the primary heat source 245, that extends through the heat element port 109, heats a region 144 in the regolith 112 in a gap 264 (defined between a heat recovery sled 280 and a preheat contact element 260) to a target temperature, such as 850° C. or some other temperature that may be between 600° C.-1000° C., for example. Certain embodiments envision the primary heat source 245 being the concentrated heat light beam 143b, such as that shown in FIG. 4B, or some other heat element such as a laser, ultrasonic heat element, radiant heater, contact heat element, etc. The primary heat source 245 heats a region 144 of the regolith 112 at sufficient temperature to release the gaseous materials trapped in the regolith 112.

The heat recovery elements 250 include the heat recovery sled 280 separated from the preheat contact element 260 by a primary heating gap 264, which could be several inches (e.g., 6 inches) to several feet (e.g., 3 feet) across. The preheat contact element 260, located at the underside 244 near the rover leading edge (front end) 108A, is configured to contact and preheat the regolith 112. Certain embodiments envision the preheat contact element 260 and heat recovery sled 280 extending beyond the perimeter of the rover 102. In this embodiment, the preheat contact element 260 is a rake comprising a plurality of bladed plates 266 that dig into the regolith 112 to provide both conductive and radiative heat transfer to the regolith 112. The heat recovery sled 280, located on the trailing 108B underside 244 of the rover 102, is also configured to contact the regolith 112 and pull residual heat left over from the heat produced by the primary heat source 245. In this embodiment, the heat recovery sled 280 comprises a plurality of rails 286 (see FIG. 6E) each with a rail leading edge 282 configured to dig into the regolith 112. The sled rails 286 increases the surface area of where the heat recovery sled 280 interfaces the regolith 112 for more efficient heat collection via radiation and conduction. The collected heat is transferred to the preheat contact element 260 via a liquid heat transfer medium 305 that cycles through the heat recovery sled 280 via a heat exchange tube arrangement 300. A gas collecting shield 252 covers at least the heating gap 264, and in this embodiment, at least a part of the preheat contact element 260. The gas collecting shield 252 is configured to contain gas liberated from the regolith 112 heated by the primary heat source 245.

As shown in connection with FIGS. 6D1-6D3 in view of FIG. 6B, the primary heat source 245 heats a first region 144A of regolith 112 to a temperature of 850° C. (or some other suitable temperature that will release target gases from the regolith 112) as shown in FIG. 6D1. As the rover 102 moves forward 242, the heat recovery sled 280 moves into contact with the first heated region 144A, which may have cooled down a little bit by the time it reaches the heat recovery sled 280 but will still be reasonably high. In this example, the heated region cools to 825° C., as shown in the example of FIG. 6D2. Meanwhile, the primary heat source 245 heats a second region 144B to a temperature of 850° C. As the rover 102 continues to move forward 242, as shown in FIG. 6D3, heat from the first region 144A heats up the heat recovery sled 280 via conduction and radiative heat transfer while the second region 144B moves in contact with the heat recovery sled 280. The heat recovered from the first region 144A by the heat recovery sled 280 is transferred to the preheat contact element 260 via a liquid heat transfer medium 305 cycled through the heat recovery sled 280 and the preheat contact element 260. The heated medium 305A, of FIG. 6F, exchanges its heat to the preheat contact element 260, i.e., the heated medium 305A heats up the preheat contact element 260, which in turn preheats a third region 144C of the regolith 112. As further shown in FIG. 6D3, the primary heat source 245 continues to heat the gap region 264, which is depicted by the heated region 144B'. As the rover 102 continues to move forward 242, naturally, the third region 144C will move in front of the primary heat source 245 already at an elevated temperature (in this example a temperature of 500° C.), thereby reducing the amount of energy required to bring the third region 144C up to the target temperature. Some embodiments envision the rover 102 moving continuously while other embodiments envision the rover 102 stopping and starting (stuttered forward motion).

Figure 6E:
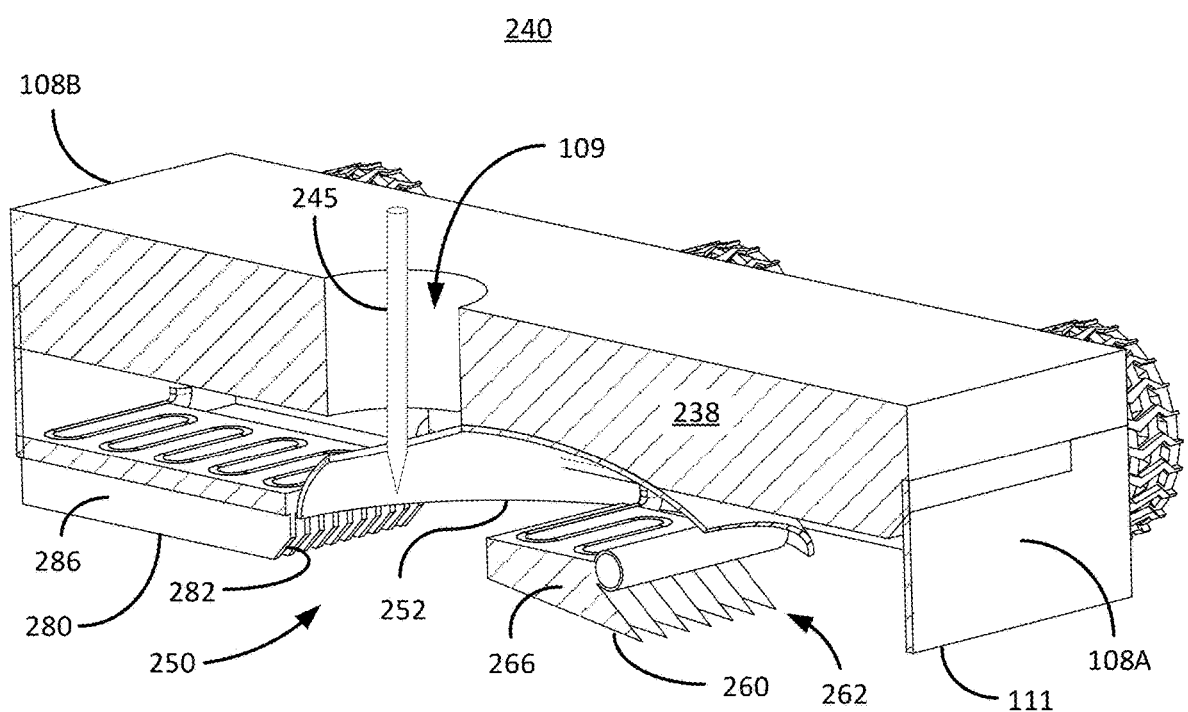

FIG. 6E is an isometric cross-section view of the heat recovery/exchange arrangement 240 shown in FIG. 6B consistent with embodiments of the present invention. The angled view of FIG. 6E provides a different perspective of the heat recovery elements 250 and gas collecting shield 252, which is partially sectioned to provide a better view of the heat recovery elements 250. This perspective shows the preheat plates teeth 262, which slice into the regolith 112 as the rover 102 moves forward. The preheat plates (rake) 266 also increase the surface area of the preheat contact element 260 to increase heat exchange. The heat recovery sled 280 comprises a plurality of rails 286 each with a rail leading edge 282 that digs/slides into the regolith 112. Like the preheat plates 266, the sled rails 286, when embedded in the regolith 112, increases the surface area of where the sled 280 interfaces the regolith 112, which produces more efficient heat collection via radiation and conduction. As mentioned earlier, the cover rim 111 can be at or within an inch or two of the regolith 112.

Figure 6F:
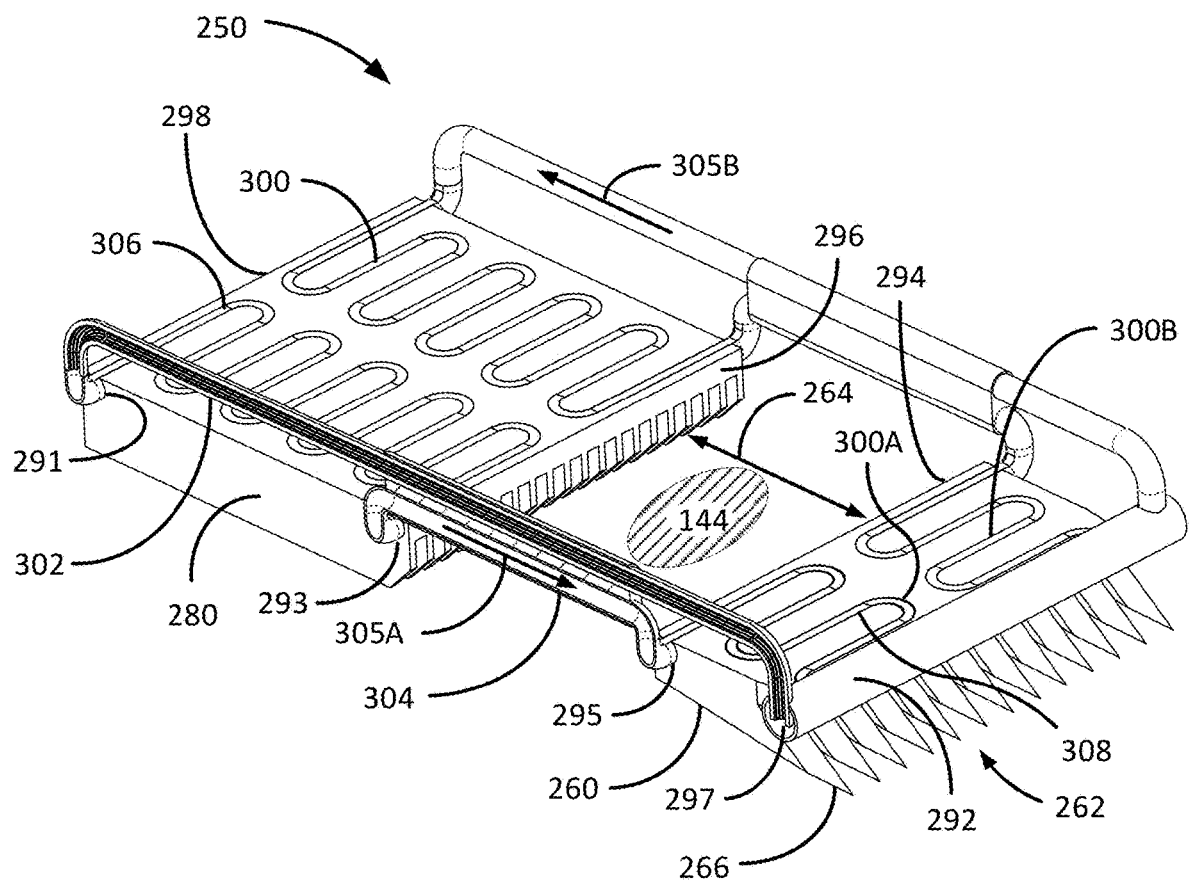

FIG. 6F is an isometric view of the heat recovery elements 250 showing the feed line 304 and the return line 302 cross sectioned. In this embodiment, the feed line 304 and the return line 302 link the heat recovery sled 280 with the preheat contact element 260, which are separated by a heating gap 264. The primary heat source heated region 144 is shown via a shaded ellipse in the heating gap 264. As shown here, there are two heat exchange tubes 300, a first heat exchange tube 300A on the left side of the heating elements 260/280 and a second heat exchange tube 300B on the right side of the heating elements 260/280. Each heat exchange tube 300 is a closed system that contains a heat exchange medium 305. Non limiting examples of a heat exchange medium (working fluid) 305 includes the use of liquid metals (metals that are in a liquid form above their melting point), such as mercury, cesium, rubidium, potassium, sodium, lithium, calcium, lead, indium, silver, for example. A publication incorporated herein by reference entitled "A review of liquid metal high temperature heat pipes: Theoretical model, design, and application" by Tian et al., published in the International Journal of Heat and Mass Transfer provides examples and thermodynamic analysis of heat pipes using liquid and vapor metals. Table 1 below is a listing of various liquid metals 305 along with their relative melting points, boiling points and operation temperature range. It should be noted that the metal when in essentially a solid/non-liquid state can be heated by an auxiliary electric heater (not shown) to melt the frozen liquid metal.

TABLE 1

| Working Fluid | | Melting Point at 1 atm (K) | Boiling Point at 1 atm (K) | Operation Temperature Range |
|---|---|---|---|---|
| Mercury | (Hg) | 234.2 | 630.1 | 523-923 |
| Cesium | (Cs) | 301.6 | 943.0 | 723-1173 |
| Rubidium | (Rb) | 312.7 | 959.2 | 800-1275 |
| Potassium | (K) | 336.4 | 1032 | 773-1273 |
| Sodium | (Na) | 371.0 | 1151 | 873-1473 |
| Lithium | (Li) | 453.7 | 1615 | 1273-2073 |
| Calcium | (Ca) | 1112 | 1762 | 1400-2100 |
| Lead | (Pb) | 600.6 | 2013 | 1670-2200 |
| Indium | (In) | 429.7 | 2353 | 2000-3000 |
| Silver | (Ag) | 1234 | 2485 | 2073-2573 |

Figure 6G:
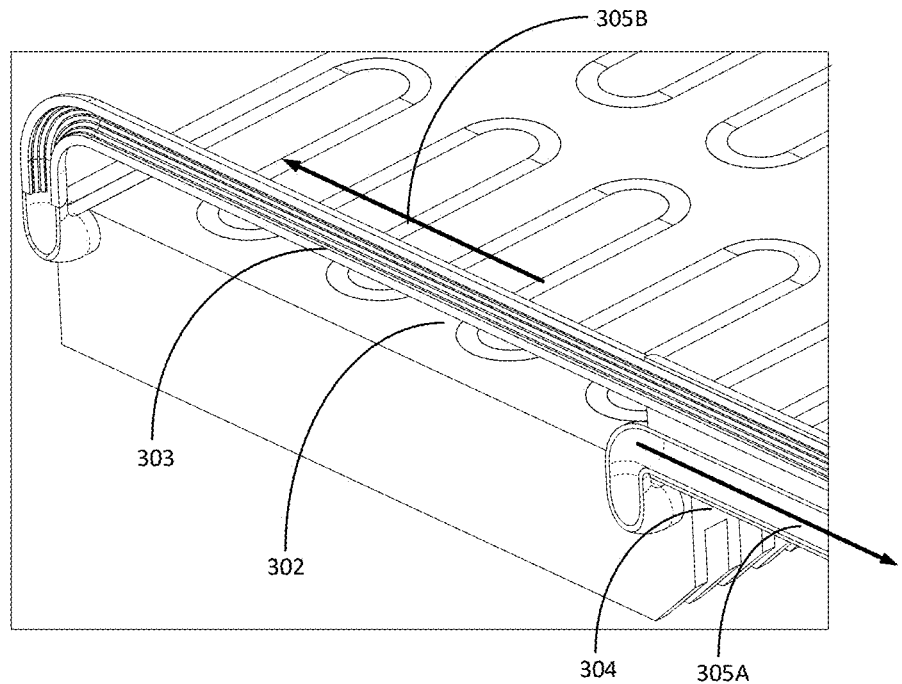

With continued reference to FIG. 6F and with respect to the first heat exchange tube 300A, a heat collecting coil 306 is embedded in the heat recovery sled 280 and a heat emitting coil 308 is embedded in the preheat contact element 260. The heat collecting coil 306 loops between the heat emitting coil 308 via a feed line 304 and a return line 302. The feed line 304 connects to the heat collecting coil 306 at a first junction 291 at the sled trailing edge 298. The feed line 304 further connects to the heat emitting coil 308 at a fourth junction 297 at the preheat contact element leading edge 292. The return line 302 connects the heat collecting coil 306 at a second junction 293 at the sled leading edge 296 to the heat emitting coil 308 at a third junction 295 at the preheat contact element trailing edge 294. In operation, the heat recovery sled 208 picks up heat from the heated region 144 of the regolith 112 and heats the cooled medium 305B received from the preheat contact element 260 via the feed line 304. The cooled medium 305B is heated as flows through the heat collecting coil 306 towards the return line 302. The heated medium 305A is essentially its maximum temperature upon exiting the heat collecting coil 306 at the sled leading edge 296. The heated medium 305A flows into the preheat contact element 260 at the third junction 295 via the return line 302. Heat is exchanged to the preheat contact element 260 as the heated medium 305A flows through the heat emitting coil 308 to the preheat contact element leading edge 292. Heat is exchanged from the preheat contact element 260 to the regolith 112, thereby cooling down the heat transfer medium 305 in the heat emitting coil 308. The heated preheat contact element 260 (heated by the heated medium 305A), in turn, exchanges or otherwise heats up the regolith 112 through conduction and radiation. The heat transfer medium 305 is cooled to essentially its minimum temperature upon exiting the heat emitting coil 308 at the preheat contact element leading edge 392. The cooled medium 305B is returned to the heat recovery sled 280 via the return line 302. Certain embodiments contemplate the heat transfer medium 305 being a liquid flowing through a wicking structure 303, such as capillary tubes shown in FIG. 6G, in the return line 302 but a vapor in the feed line 304. FIG. 6G is a closeup of a portion of the return line 302 and feed line 302 of the first heat exchange tube 300A at the heat recovery sled 280.

Figure 6H:
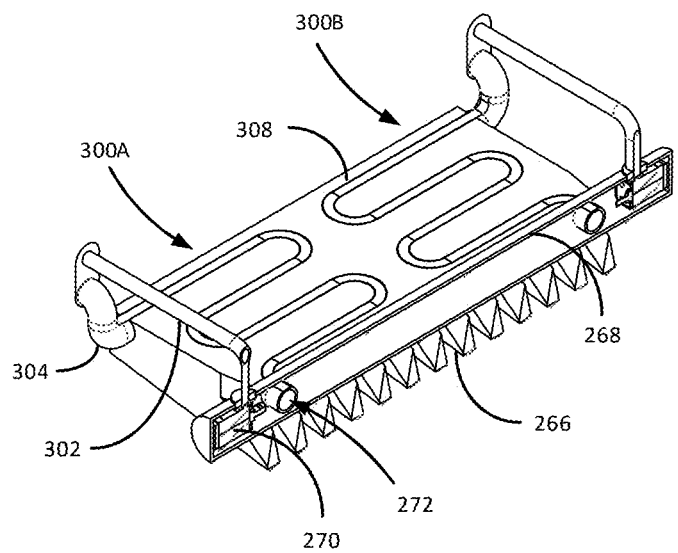
FIG. 6H is an active circulation system connected to the heat exchange tubes consistent with embodiments of the present invention.

FIG. 6H is an active circulation system connected to the heat exchange tubes consistent with embodiments of the present invention. Unlike the passive wicking elements 303 shown in FIGS. 6F and 6G, FIG. 6H depicts an active pump 270 in line with the first and second heat exchange tubes 300A and 300B. Though the pumps 270 can reside in other locations along the heat exchange tubes 300A and 300B, in this embodiment, the pumps 270 are in a preheat housing 268 at the front of the preheat contact element 260 just above the preheat plates 266, as shown. In this embodiment the pumps 270 are connected to their respective return lines 302. The heat transfer medium 305 is circulated by the pumps 270 from the heat emitting coil 308 through the heat emitting coil exit port 272 and into the return line 302. It should be appreciated that with a pump 270 there will be no wicking element 303, rather the pumping/active system works with an unobstructed return tube.

With the present description in mind, below are some examples of certain embodiments illustratively complementing some of the apparatus embodiments discussed above and presented in the figures to aid the reader. Accordingly, the elements called out below are provided by example to aid in the understanding of the present invention and should not be considered limiting. The reader will appreciate that the below elements and configurations can be interchangeable within the scope and spirit of the present invention. The illustrative embodiments can include elements from the figures.

In that light, certain embodiments of the present invention envision a heat recovery arrangement 240 generally comprising a rover 102 carrying a primary heat source 245 that cooperates or otherwise works/functions with an arrangement of heat recovery elements 250. The rover 102 can be defined has having wheels or tracks 208 that moved the rover 102 over an extra-terrestrial surface. The rover can be defined between a rover front end 108A and a rover rear end 108B, wherein the rover 102 is configured to travel in a direction 242 leading with the rover front end 108A. The heat recovery elements 250 include a preheat contact element 260 and a heat recovery sled 280, both of which are configured to rest atop granular soil 112. The heat recovery elements 250 further include a gap 264 spacing apart the preheat contact element 260 from the heat recovery sled 280, wherein the preheat contact element 260 is closer to the rover front end 108A than the heat recovery sled 280. The heat recovery arrangement 240 further includes a primary heat source 245 (configured to heat the granular soil 112 in the gap 264) and a gas collecting shield 252 covering at least the gap 264. The heat recovery elements 250 further include a heat exchange tube 300 comprising a feed line 304, a return line 302, a heat collecting coil 306, and a heat emitting coil 308, wherein the feed line 304 is configured to flow heated medium 305A from a heat collecting coil 306 to the to the heat emitting coil 308, the return line 302 is configured to flow cooled medium 305B from the heat emitting coil 308 to the heat collecting coil 306. The heat recovery sled 280 contains the heat collecting coil 306 and the preheat contact element 260 contains the heat emitting coil 308. The gas collecting shield 252, the preheat contact element 260 and the heat recovery sled 280 are located under the rover 102.

The heat recovery arrangement 240 further envisions the gas collecting shield 252 covering at least part of the contact heat source 260 while other embodiments envision the gas collecting shield 252 basically encapsulating the space between the regolith 112 in the gap 264.

In some embodiments, the heat recovery arrangement 240 envisions the primary heat source 245 being configured to heat the granular soil in the gap 264 via a light beam 143b.

The heat recovery arrangement 240 further imagines the primary heat source 245 being connected to at least one solar collector 120, which provides the energy that is converted to heat.

The heat recovery arrangement 240 further contemplates the preheat contact element 260 comprising a plurality of blades 266 that are configured to penetrate the granular soil 112 linearly in the direction 242.

In one embodiment, the heat recovery arrangement 240 envisions the heat collecting coil 306 being embedded in the heat recovery sled 280 and the heat emitting coil 308 being embedded in the preheat contact element 260.

Another embodiment contemplates the heat exchange tube 300 of the heat recovery arrangement 240 further comprising a pump 270 that is configured to circulate the heated medium 305A and the cooled medium 305B.

The heat recovery arrangement 240 can optionally use a liquid metal as the medium 305 for heat transfer.

In other embodiments, the heat recovery arrangement 240 imagines, when in operation, the heated medium 305A being in a gas phase when and the cooled medium 305B being in a liquid phase. The heated medium 305A is defined as the medium 305 when transitioning to the preheat contact element 260 via the feed line 304 and the cooled medium 305B is defined as the medium 305 when transitioning to the heat recovery sled 280 via the return line 302.

The heat recovery arrangement 240 further contemplates the return line 302 comprising a plurality of capillary tubes 303, porous wicking structures that use capillary action but are not necessarily tubes.

The heat recovery arrangement 240 is envisioned having the preheat contact element 260 providing heat to the granular soil 112 before the primary heat source 245 heats the granular soil 112 in the gap 264. The granular soil 112 can be regolith in lunar applications.

Still other embodiments envision a heat recovery system 240 generally comprising a rover 102 carrying a primary heat source 245 that cooperates with an arrangement of heat recovery elements 250, the rover 102 being configured to move in a forward direction 242. The heat recovery elements 250 can include a preheat contact element 260 that is configured to contact and preheat granular soil 112 and a heating gap 264 between the preheat contact element 260 and a heat recovery sled 280. The heat recovery system 240 further includes a primary heat source 245 that is configured and arranged to heat a region 144 of the preheated granular soil 112B in the gap 264. The heat recovery sled 280 is configured and arranged to collect at least a portion of the heat from the region 144 when the rover 102 moves the heat recovery sled 280 in contact with the region 144. The heat recovery system 240 further includes a gas collecting shield 252 covering at least the gap 264, wherein the gas collecting shield 252 is configured to contain gas liberated from the granular soil 112 when the granular soil 112 is heated by the primary heat source 245. The heat recovery elements 250 further include a heat exchange tube 300 comprising a feed line 304 that is configured to carry warmed medium 305A from a heat collecting coil 306 in the preheat contact element 260 to a heat emitting coil 308 in the heat recovery sled 280, and a return line 302 that is configured to carry cooled medium 305B from the heat emitting coil 308 to the to the heat collecting coil 306. The gas collecting shield 252, the preheat contact element 260 and the heat recovery sled 280 are located on an under side 244 the rover 102.

The heat recovery system 240 further envisions the preheat contact element 260 being configured to preheat the region 144 to a first temperature and wherein the primary heat source 245 is configured to heat the region of granular soil 144 to a second temperature that is higher than the first temperature when the region of granular soil 144 moved to the gap 264.

The heat recovery system 240 further imagines the preheat contact element 260 and the heat recovery sled 280 being configured to contact the granular soil 112.

The gas collecting shield 252 in the heat recovery system 240 can further cover at least part of the contact heat source 260.

The heat recovery system 240 further contemplates the preheat contact element 260 comprising a plurality of preheat plates 266 that are configured to penetrate and drag through the granular soil 112 along the forward direction 242 (in essentially a linear direction not to be confused with a spinning or drilling bit).

Another embodiment of the present invention contemplates a method for using rover 102 supporting a heat recovery system 240 wherein the method generally comprises steps for heating granular soil 112, such as regolith, while moving the rover 102. More specifically, the method can include a heating step for heating a first region of granular soil 144A in a gap 264 between a preheat contact element 260 and a heat recovery sled 280 with a primary heat source 245. Moving the heat recovery sled 280 in contact with the first region of granular soil 144A. Warming a medium 305A that is circulating through a heat collecting coil 306 while the heat recovery sled 280 is in contact with the first region of granular soil 144A. The coil being embedded in or otherwise snaking through the the heat recovery sled 280. The warming step is accomplished by collecting a portion of the heat from the heated granular soil 112B. The method further includes preheating a second region of granular soil 144B by circulating the warmed medium 305A through a heat emitting coil 308 embedded in the preheat contact element 260. Moving the gap 264 over the preheated second region of granular soil 144B and heating the preheated second region of granular soil 144B via the primary heat source 245.

The method can further comprise a step for containing gas liberated from the heated first region of granular soil 144A in a gas collecting shield 252 that covers the gap 264. Some embodiments contemplate the gas collecting shield 252, the preheat contact element 260 and the heat recovery sled 280 being located under the rover 102.

The method further envisions the primary light source 245 being a beam of light 143b.

Still other embodiments of the present invention envision a CPC heating arrangement 100 that generally comprises a transporter 102a that carries a plurality of CPCs 120 that are equipped to heat granular soil 112 to mine target gases trapped in the granular soil 112, a depicted largely in FIG. 3A. More specifically, the transporter 102a comprises a transporter body 109 defining a top end 107 and a bottom end 101, wherein the bottom end 101 is configured to interface a surface 112A of an extra-terrestrial body 141. The transporter 102a is configured to be moved in different locations on the extra-terrestrial body 190, such as the moon 141. The CPC arrangement further comprises a cover 110 having an internal cover volume 114, which is a volume within the cover 110 defined from between a cover rim 111 and an inside cover top 107c of the cover 110. The internal cover volume 114 is defined by a shielded environment 114 when the cover rim 111 rests atop granular soil 112. The shielded environment 114 is the internal volume of the cover and is only in communication with an outside environment 116 via the cover rim 111 when the cover rim 111 is not resting atop the granular soil 112. Resting atop means in contact with the granular soil wherein there are essentially no gaps between the granular soil surface 112a and the cover rim 111. Resting can be wherein at least a portion of the weight of the cover 110 is supported by the granular soil 112 or if the cover 110 is pressed into the granular soil 112 via a motorized actuator connected to the transporter 102a. The plurality of CPCs 120 extends from the top end 107, such as an array 122 on an armature or frame 121. Each CPC 120 comprises a concave reflective bowl 130 having a refractive index of at least 1.4. Each of the concave reflective bowls 130 are defined between a bowl rim 134 and a bowl apex 136, wherein the bowl rim 134 is configured to confront the sun 140 and the bowl apex 136 (an aperture located at the bowl apex 136) is configured to receive sunlight 142 from the concave reflective bowl 134. Each of the concave reflective bowls 130 further comprises a fiberoptic cable 124 extending from a fiberoptic inlet end 128 connected to the bowl apex 136 to a fiberoptic outlet end 126 located in the internal volume 114. The fiberoptic outlet end 126 is configured to reside within 6 inches from the granular soil 112. The sunlight 142 is configured to be received at the fiberoptic inlet end 128 and emitted at the fiberoptic outlet end 126.

Another embodiment of the present invention contemplates a CPC arrangement 100 generally comprising a transporter 102a, an internal cover volume 114 and a cryogenically cooled condensation surface 115. The transporter 102a supports a plurality of CPCs 120 each configured to receive sunlight. Each CPC 120 comprises a concave reflective bowl 130 defined between a bowl rim 134 and a bowl apex 136 comprising a bowl aperture and a fiberoptic cable extending from a fiberoptic inlet end 128 at the apex 136 to a fiberoptic outlet end 126. The fiberoptic outlet end 126 is configured to emit the sunlight, that is received at the fiberoptic inlet end 128 from the bowl aperture, on a granular surface 112. The CPC arrangement 100 further comprises an internal cover volume 114 defined within a cover 110 that extends from an internal cover top 107c to a cover rim 111. There is a cryogenically cooled surface 115 within the internal cover volume 114, wherein the cryogenically cooled surface 115 configured to be cooled by cryogenic liquid. The fiberoptic outlet end 126 extends into the internal cover volume 114.

The CPC arrangement 100 further envisions the cover 110 being connected to the transporter 102a.

The CPC arrangement 100 further imagines the transporter 102a being a rover 102.

The CPC arrangement 100 further contemplates the plurality of CPCs 120 being arranged in a semi-sphere on at least one side of the transporter 102a.

The CPC arrangement 100 further considers the plurality of CPCs 120 being arranged in a convex array 122 on at least one side of the transporter 102a. Here, the convex array 122 can optionally be bowl-shaped 162.

The CPC arrangement 100 further envisions each of the concave reflective bowls 130 being parabolic-shaped.

The CPC arrangement 100 contemplates at least one of the plurality of concave reflective bowls 130 being connected to a redirector, such as a redirecting spring and nitinol deflector arrangement 180, that is configured to move the at least one concave reflective bowls 130 to better confront the sun 140 as it traverses above the transporter 102a. The redirector can be a nitinol linkage that moves when heated and cooled, at least one hydraulic lifter, a motor driven linkage that moves each CPC 120, etc.

The CPC arrangement 100 further envisions an embodiment wherein the plurality of concave reflective bowls 130 are statically mounted on the transporter 102a, meaning they cannot be adjusted or moved to track the sun 140, for example.

The CPC arrangement 100 further envisions the transporter 102a being configured to traverse the extra-terrestrial body 141 in a first direction 195 while the sun 140 is in a rising trajectory and the transporter 102a being configured to traverse the extra-terrestrial body 141 in a second direction 196 while the sun 140 is in a setting trajectory.

The CPC arrangement 100 further imagines at least one of the fiberoptic cables 124 being connected to a fiberoptic redirector or motor that is configured to move or bend the at least one fiberoptic cable 124 to shine the sunlight 142 over a region 144 of the granular soil 112.

The CPC arrangement 100 further contemplates the fiberoptic outlet ends 126 being arranged in a line that is configured to traverse the granular soil 112 (like the teeth of a rake) as the transporter 102a traverses the extra-terrestrial body 141.

The CPC arrangement 100 can further comprise a light concentrator lens 129 configured to receive the sunlight 142 at the bowl apex 136 and concentrate the sunlight 142 into concentrated light 143a that is transmitted through the fiberoptic cable 124.

The CPC arrangement 100 can further comprise a secondary concentration lens 133 that is configured to receive the sunlight 142 from the fiberoptic outlet end 126 and concentrate the sunlight 142 into a high heat light concentrated beam 143b that is directed to the granular soil 112.

Yet another embodiment of the present invention contemplates a CPC system 100 that generally comprises a transporter 102a that carries a plurality of CPCs 120 that are equipped to heat regolith 112 to mine target gases trapped in the regolith 112. More specifically, the transporter 102a defines a top end 107 and a bottom end 101 with the bottom end being configured to interface regolith 112. The transporter 102a configured to be moved in different locations on the moon 141. The CPC system 100 further comprises a cover 110 that defines a shielded environment 114 when a cover rim 111 of the cover 110 rests atop the regolith 112. The shielded environment 114 (or the internal cover volume when not in contact with the regolith 112) is only in communication with an outside environment 116 via the cover rim 111 when the cover 110 does not rest atop the regolith 112. The plurality of CPCs 120 extends from the top end 107, wherein each CPC 120 comprises a concave parabolic reflective bowl 130. Each of the concave reflective bowls 130 is defined between a bowl rim 134 and a bowl apex 136, wherein the bowl rim 134 is configured to receive sunlight. An aperture in the bowl apex 136 is configured to receive the sunlight 142 from the concave reflective bowl 134. A fiberoptic cable 124 extends from a fiberoptic inlet end 128 to a fiberoptic outlet end 126 and connects to the bowl apex 136 at the fiberoptic inlet end 128. The fiberoptic cable 124 is in light communication with the aperture, meaning light moves through the aperture and into the fiberoptic cable 124. The fiberoptic outlet end 126 is located in the shielded environment 114 and is configured to interface the regolith 112. The fiberoptic cable 124 is configured to transmit the sunlight 142 from the fiberoptic inlet end 128 through the fiberoptic outlet end 126.

The CPC system 100 further envisions the shielded environment 114 extending from a wagon 102b that is configured to be moved by a rover 102.

The CPC system 100 further imagines the transporter 102a being a rover 102 or a wagon 102b.

The CPC system 100 can further comprise a light concentrator lens 129 that bridges the aperture and the fiberoptic inlet end 128.

The CPC system 100 can further comprise a secondary concentration lens 133 that is configured to focus light from the fiberoptic outlet end 126.

Still, another embodiment of the present invention contemplates a CPC and gas collection arrangement 100 that generally comprises a transporter 102a that carries a plurality of CPCs 122 that are equipped to heat granular soil 112 to mine target gases trapped in the granular soil 112. More specifically, the transporter 102a is configured to be moved in different locations on the moon 141. The arrangement 100 further comprises a cover 110 that defines a shielded environment 114 when a cover rim 111 of the cover 110 rests atop the regolith 112. The shielded environment 114 is not in communication with an outside environment 116. The plurality of CPCs 122, wherein each of the plurality of CPCs 120 comprises a concave parabolic reflective bowl 130 that is defined between a bowl rim 134 and a bowl apex 136. The bowl rim 134 is configured to receive sunlight and direct the sunlight 142 to and aperture at the bowl apex 136.

The arrangement 100 can further comprise a fiberoptic cable 124 that has a fiberoptic inlet end 128 extending from the aperture and a fiberoptic outlet end 126 that extends into the shielded environment 114. The fiberoptic outlet end 126 is configured to interface the regolith 112, wherein the sunlight 142 is configured to be received at the fiberoptic inlet end 128 and emitted at the fiberoptic outlet end 126.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended embodiments are expressed. For example, the orientation of the elements and the plate can include other geometries not explicitly shown in the embodiments above while maintaining essentially the same functionality without departing from the scope and spirit of the present invention. Likewise, the materials and construction of the cooling surfaces can vary but serve the same purpose without departing from the scope and spirit of the present invention. It should further be appreciated that the arrangement of the CPCs 120, the cover, the transporter, and the arrangement of the fiberoptic cables can vary while maintaining the functionality described within the scope and spirit of the present invention. Moreover, the electronics and computing that enable the functionality of the gas collection system are not described in detail because the electronics and computing elements either exist or are easily constructed by those skilled in the art.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A heat recovery arrangement comprising:
   a rover defining a rover front end and a rover rear end, wherein the rover is configured to travel in a direction leading with the rover front end;
   both a preheat contact element and a heat recovery sled configured to rest atop granular soil;
   a gap spacing apart the preheat contact element from the heat recovery sled, wherein the preheat contact element is closer to the rover front end than the heat recovery sled;
   a primary heat source configured to heat the granular soil in the gap;
   a gas collecting shield covering at least the gap; and
   a heat exchange tube comprising a feed line, a return line, a heat collecting coil, and a heat emitting coil, wherein;
   the feed line is configured to flow heated medium from the heat collecting coil to the to the heat emitting coil,
   the return line is configured to flow cooled medium from the heat emitting coil to the heat collecting coil,
   the heat recovery sled contains the heat collecting coil and the preheat contact element contains the heat emitting coil, and
   the gas collecting shield, the preheat contact element and the heat recovery sled are located under the rover.

2. The heat recovery arrangement of claim 1, wherein the gas collecting shield further covering at least part of the preheat contact element.

3. The heat recovery arrangement of claim 1, wherein the primary heat source is configured to heat the granular soil in the gap via a light beam.

4. The heat recovery arrangement of claim 1, wherein the primary heat source is connected to at least one solar collector.

5. The heat recovery arrangement of claim 1, wherein the preheat contact element comprises a plurality of preheat plates configured to penetrate the granular soil linearly in the direction of travel.

6. The heat recovery arrangement of claim 1, wherein the heat collecting coil is embedded in the heat recovery sled and the heat emitting coil is embedded in the preheat contact element.

7. The heat recovery arrangement of claim 1, wherein the heat exchange tube further comprises a pump configured to circulate the heated medium and the cooled medium.

8. The heat recovery arrangement of claim 1, wherein the medium is a liquid metal.

9. The heat recovery arrangement of claim 1, wherein the heated medium is configured to operate in a gas phase and the cooled medium is configured to operate in a liquid phase.

10. The heat recovery arrangement of claim 1, wherein the return line comprises a plurality of capillary tubes.

11. The heat recovery arrangement of claim 1, wherein the preheat contact element is configured to provide heat to the granular soil before the primary heat source heats the granular soil in the gap.

12. A heat recovery system comprising:
- a rover configured to move in a forward direction;
- a preheat contact element configured to contact and preheat granular soil;
- a heating gap between the preheat contact element and a heat recovery sled;
- a primary heat source configured to heat a region of the preheated granular soil in the gap, the heat recovery sled configured to collect at least a portion of the heat from the region when the rover moves the heat recovery sled in contact with the region;
- a gas collecting shield covering at least the gap, wherein the gas collecting shield is configured to contain gas liberated from the granular soil when heated by the primary heat source; and
- a heat exchange tube comprising:
- a feed line configured to carry warmed medium from a heat collecting coil in the preheat contact element to a heat emitting coil in the heat recovery sled, and
- a return line configured to carry cooled medium from the heat emitting coil to the heat collecting coil,
- the gas collecting shield, the preheat contact element and the heat recovery sled are located on an under side of the rover.

13. The heat recovery system of claim 12, wherein the preheat contact element is configured to preheat the region to a first temperature and wherein the primary heat source is configured to heat the region to a second temperature that is higher than the first temperature when the gap is moved to the region.

14. The heat recovery system of claim 12, wherein the preheat contact element and the heat recovery sled are configured to contact the granular soil.

15. The heat recovery system of claim 12, wherein the gas collecting shield further covering at least part of the contact heat source.

16. The heat recovery system of claim 12, wherein the preheat contact element comprises a plurality of preheat plates configured to penetrate and drag through the granular soil along the forward direction.

17. A method for using a heat recovery system, the method comprising:
- heating a first region of granular soil in a gap between a preheat contact element and a heat recovery sled with a primary heat source;
- moving the heat recovery sled in contact with the first region of granular soil;
- warming a medium circulating through a heat collecting coil that is embedded in the heat recovery sled while the heat recovery sled is in contact with the first region of granular soil;
- preheating a second region of granular soil by circulating the warmed medium through a heat emitting coil embedded in the preheat contact element; and
- moving the gap over the preheated second region of granular soil and heating the preheated second region of granular soil via the primary heat source.

18. The method of claim 17 further comprising containing gas liberated from the heated first region of granular soil in a gas collecting shield covering the gap.

19. The method of claim 18, wherein the gas collecting shield, the preheat contact element and the heat recovery sled are located under the rover.

20. The method of claim 17, wherein the primary light source is a beam of light.

* * * * *